(12) United States Patent
Shepard et al.

(10) Patent No.: US 8,968,495 B2
(45) Date of Patent: Mar. 3, 2015

(54) METHODS OF THERMO-MECHANICALLY PROCESSING TOOL STEEL AND TOOLS MADE FROM THERMO-MECHANICALLY PROCESSED TOOL STEELS

(75) Inventors: Christon L. Shepard, Middletown, OH (US); Shrinidhi Chandrasekharan, Dayton, OH (US); Ronald R. LaParre, Centerville, OH (US); David L. Turpin, Springboro, OH (US); Alan L. Shaffer, Cincinnati, OH (US)

(73) Assignee: Dayton Progress Corporation, Dayton, OH (US)

( * ) Notice: Subject to any disclaimer, the term of this patent is extended or adjusted under 35 U.S.C. 154(b) by 666 days.

(21) Appl. No.: 12/370,906

(22) Filed: Feb. 13, 2009

(65) Prior Publication Data

US 2009/0229417 A1 Sep. 17, 2009

Related U.S. Application Data

(63) Continuation-in-part of application No. 12/047,532, filed on Mar. 13, 2008.

(60) Provisional application No. 60/896,729, filed on Mar. 23, 2007, provisional application No. 61/029,236, filed on Feb. 15, 2008.

(51) Int. Cl.
*C21D 7/13* (2006.01)
*B21D 37/01* (2006.01)
(Continued)

(52) U.S. Cl.
CPC . *B21D 37/01* (2013.01); *B21J 5/08* (2013.01); *B21K 5/20* (2013.01); *B26F 1/14* (2013.01);
(Continued)

(58) Field of Classification Search
CPC ............... C21D 1/22; C21D 2211/008; C21D 2211/001; B21D 37/01; B21J 5/08; B21K 5/20
USPC ......................................... 76/101.1; 148/648
See application file for complete search history.

(56) References Cited

U.S. PATENT DOCUMENTS 229,840 A 7/1880 Richards
254,195 A 2/1882 Brown
(Continued)

FOREIGN PATENT DOCUMENTS

EP 0587489 A1 3/1994
EP 1657315 A1 5/2006
(Continued)

OTHER PUBLICATIONS

Hughes, et al., "Scaling of Misorientation Angle Distributions", Physical Review Letters, vol. 81, No. 21, Nov. 23, 1998.
(Continued)

*Primary Examiner* — Kaj K Olsen
*Assistant Examiner* — Alexander Polyansky
(74) *Attorney, Agent, or Firm* — Wood, Herron & Evans, LLP

(57) ABSTRACT

A method of thermo-mechanically processing a preform composed of tool steel and a tool to modify a workpiece. The preform has a region containing austenite. The method comprises establishing the region at a process temperature between a martensitic start temperature and a stable austenitic temperature. While at the process temperature, the region is deformed to change an outer dimension and to modify the microstructure to a depth of 1 millimeter or more. The tool comprises a member composed of tool steel. The member includes a first region that extends from the outer surface to a depth of greater than 1 millimeter and a second region. The first region includes a plurality of grains having an average misorientation angle greater than about 34°, an average grain size that is at least 10% smaller than the second region, and has a different grain orientation than the second region.

22 Claims, 19 Drawing Sheets

(51) Int. Cl.

| | |
|---|---|
| *B21J 5/08* | (2006.01) |
| *B21K 5/20* | (2006.01) |
| *B26F 1/14* | (2006.01) |
| *C21D 1/18* | (2006.01) |
| *C21D 1/19* | (2006.01) |
| *C21D 1/20* | (2006.01) |
| *C21D 6/00* | (2006.01) |
| *C21D 9/22* | (2006.01) |
| *B22F 5/00* | (2006.01) |
| *B26F 1/44* | (2006.01) |

(52) U.S. Cl.
CPC ....... *C21D 1/185* (2013.01); *C21D 1/19* (2013.01); *C21D 1/20* (2013.01); *C21D 6/002* (2013.01); *C21D 7/13* (2013.01); *C21D 9/22* (2013.01); *B22F 2005/002* (2013.01); *B22F 2998/00* (2013.01); *B26F 1/44* (2013.01); *B26F 2001/4436* (2013.01); *C21D 2201/05* (2013.01); *C21D 2211/001* (2013.01); *C21D 2211/008* (2013.01)
USPC .......................................... 148/648; 76/101.1

(56) References Cited

U.S. PATENT DOCUMENTS

| | | |
|---|---|---|
| 295,227 A | 3/1884 | Briggs et al. |
| 770,238 A | 9/1904 | Lovejoy |
| 1,366,026 A | 1/1921 | Rydbeck |
| 1,446,879 A | 2/1923 | Coffey |
| 1,533,263 A | 4/1925 | Pritchard |
| 1,542,047 A | 6/1925 | Ferrari |
| 1,554,336 A | 9/1925 | Lapotterie |
| 1,637,111 A | 7/1927 | Honig |
| 1,687,825 A | 10/1928 | Brassert |
| 1,952,388 A | 3/1934 | Simons |
| 1,977,845 A | 10/1934 | Emmons |
| 2,040,957 A | 3/1936 | Sanders |
| 2,656,739 A | 10/1953 | Mansfield |
| 2,717,846 A | 9/1955 | Harvey |
| 2,622,682 A | 7/1956 | Goetzel et al. |
| 2,753,261 A | 7/1956 | Goetzel et al. |
| 2,755,689 A | 7/1956 | Sundback |
| 2,767,837 A | 10/1956 | Nachtman et al. |
| 2,767,838 A | 10/1956 | Nachtman et al. |
| 2,934,463 A | 4/1960 | Schmatz et al. |
| 3,010,207 A | 11/1961 | Barnes |
| 3,076,361 A | 2/1963 | Epstein et al. |
| 3,143,026 A | 8/1964 | Akerson |
| 3,279,049 A | 10/1966 | Ellis et al. |
| 3,290,936 A | 12/1966 | Harvey |
| 3,340,102 A | 9/1967 | Kulin et al. |
| 3,396,567 A | 8/1968 | Bachmann |
| 3,413,166 A | 11/1968 | Zackay et al. |
| 3,425,877 A | 2/1969 | Deacon et al. |
| 3,535,910 A | 10/1970 | Connolly |
| 3,650,163 A | 3/1972 | Juffs |
| 3,737,981 A | 6/1973 | Plockinger et al. |
| 3,752,709 A | 8/1973 | Zackay et al. |
| 3,848,453 A | 11/1974 | Hardt |
| 3,877,281 A | 4/1975 | Shimizu et al. |
| 3,889,510 A | 6/1975 | Yamakoshi et al. |
| 3,903,761 A | 9/1975 | Runton |
| 3,903,784 A | 9/1975 | Dekker |
| 3,923,469 A | 12/1975 | Palynchuk |
| 3,964,938 A | 6/1976 | Tolliver et al. |
| 3,974,728 A | 8/1976 | Herlan |
| 4,040,872 A | 8/1977 | Mudiare |
| 4,077,812 A | 3/1978 | Tani |
| 4,095,449 A | 6/1978 | Roach et al. |
| 4,105,443 A | 8/1978 | Dearnaley et al. |
| 4,170,497 A | 10/1979 | Thomas et al. |
| 4,198,884 A | 4/1980 | Nakagawa et al. |
| 4,222,260 A | 9/1980 | McDermott |
| 4,249,945 A | 2/1981 | Haswell et al. |
| 4,259,126 A | 3/1981 | Cole et al. |
| 4,270,378 A | 6/1981 | Brown et al. |
| 4,318,733 A | 3/1982 | Ray et al. |
| 4,368,634 A | 1/1983 | Brown et al. |
| 4,526,077 A | 7/1985 | DeGuvera |
| 4,571,983 A | 2/1986 | Sanborn et al. |
| 4,587,095 A | 5/1986 | Yoshimura et al. |
| 4,608,851 A | 9/1986 | Khare |
| 4,628,178 A | 12/1986 | Miyake et al. |
| 4,644,776 A | 2/1987 | Berchem |
| 4,729,872 A | 3/1988 | Kishida et al. |
| 4,748,088 A | 5/1988 | Billgren |
| 4,793,231 A | 12/1988 | Brown |
| 4,830,930 A | 5/1989 | Taniguchi et al. |
| 4,832,764 A | 5/1989 | Merz |
| 4,838,062 A | 6/1989 | Prenn |
| 4,878,403 A | 11/1989 | Barr |
| 4,996,863 A | 3/1991 | Keeler |
| 5,054,308 A | 10/1991 | Asai et al. |
| 5,080,727 A | 1/1992 | Aihara et al. |
| 5,094,698 A | 3/1992 | Gallagher, Jr. |
| 5,110,379 A | 5/1992 | Finkl |
| 5,136,905 A | 8/1992 | Stack et al. |
| 5,345,129 A | 9/1994 | Molnar |
| 5,406,825 A | 4/1995 | Horie et al. |
| 5,511,450 A | 4/1996 | Nagao |
| 5,577,323 A | 11/1996 | Sawai et al. |
| 5,660,648 A | 8/1997 | Takada et al. |
| 5,762,725 A | 6/1998 | Pichard et al. |
| 5,820,706 A | 10/1998 | Bellus et al. |
| 5,958,158 A | 9/1999 | Kron et al. |
| 5,989,731 A | 11/1999 | Arisawa et al. |
| 6,284,366 B1 | 9/2001 | Konig et al. |
| 6,348,112 B1 | 2/2002 | Hildreth et al. |
| 6,355,119 B1 | 3/2002 | Peters et al. |
| 6,364,974 B1 | 4/2002 | Kobasko |
| 6,419,770 B1 | 7/2002 | Miyashita et al. |
| 6,454,991 B1 | 9/2002 | Yoshimura et al. |
| 6,478,900 B1 | 11/2002 | Isogawa et al. |
| 6,725,756 B2 | 4/2004 | Brenneke |
| 6,743,311 B2 | 6/2004 | Nishigori et al. |
| 6,811,899 B2 | 11/2004 | Inoue |
| 6,838,048 B2 | 1/2005 | Nishi et al. |
| 6,874,234 B1 | 4/2005 | Bauman et al. |
| 7,093,526 B2 | 8/2006 | Ando et al. |
| 7,150,897 B2 | 12/2006 | Mikus |
| 7,162,907 B2 | 1/2007 | Joseph et al. |
| 7,169,347 B2 | 1/2007 | Kuwabara et al. |
| 7,462,853 B2 | 12/2008 | Funakoshi et al. |
| 2004/0200552 A1 | 10/2004 | Fukumoto et al. |
| 2005/0227772 A1* | 10/2005 | Kletecka et al. ............... 470/63 |
| 2006/0075175 A1 | 4/2006 | Lockhart et al. |
| 2006/0157163 A1 | 7/2006 | Shimizu et al. |
| 2006/0231167 A1 | 10/2006 | Hillstrom |
| 2007/0179515 A1 | 8/2007 | Matsutani et al. |
| 2008/0308194 A1* | 12/2008 | Corquillet et al. ............ 148/531 |

FOREIGN PATENT DOCUMENTS

| | | | |
|---|---|---|---|
| EP | 1985390 A1 | 10/2008 | |
| GB | 848594 | 9/1960 | |
| JP | 56151125 A | 11/1981 | |
| JP | 08300092 | 11/1996 | |
| JP | 11254077 | 9/1999 | |
| JP | 11256271 | 9/1999 | |
| JP | 2000015379 A * | 1/2000 | ............ B21J 5/00 |
| JP | 2005314756 A | 11/2005 | |

OTHER PUBLICATIONS

Wert, et al., "Revealing Deformation Microstructures", materialstoday, Sep. 2007, vol. 10, No. 9.

European Search Report issued in corresponding European Application serial No. 09002103.1 dated Jul. 6, 2009.

European Patent Office, International Search Report issued in corresponding European patent application No. 08251055.3 dated Sep. 26, 2008.

(56) References Cited

OTHER PUBLICATIONS

International Searching Authority, International Search Report issued in corresponding PCT Application serial No. PCT/US2008/057338 dated Jun. 25, 2008, 2 pages.

Devor, et al., "Microstructure-Level Model for the Prediction of Tool Failure in WC-Co Cutting Tool Materials", Journal of Manufacturing Science and Engineering, Aug. 2006, vol. 128, Issue 3, Abstract, 1 page.

Porter Precision Products, http://www.porterpunch.com/home.html, printed Feb. 1, 2007 (2 pages).

Dieter, George, "Mechanical Metallurgy", Jun. 1986, Title, Copyright, Table of Contents, pp. 524-539, McGraw-Hill, New York, U.S.

USPTO, Office Action issued in related U.S. Appl. No. 12/047,532 dated Jul. 16, 2010.

U.S. Patent and Trademark Office, Office Action issued in U.S. Appl. No. 12/047,532 dated Jan. 19, 2011.

Ramanthan, et al., "Effect of prior microstructure on austenite decomposition and associated distortion" Aug. 2001, retrieved from http://www.forging.org/FIERF/pdf/Microstructure.pdf on Jun. 20, 2009.

International Search Report issued in corresponding PCT Application serial No. PCT/US2009/33887 dated Jun. 30, 2009.

U.S. Patent and Trademark Office, Office Action in U.S. Appl. No. 12/047,532 dated Jul. 19, 2011.

European Patent Office, European Search Report issued in corresponding European Patent Application No. 11 16 5001 dated Jul. 15, 2011.

Mexican Patent Office, Office Action in Mexican Patent Application No. MX/a/2009/001768, dated Apr. 11, 2014.

USPTO, Office Action issued in related U.S. Appl. No. 12/047,532 dated May 29, 2013.

Japanese Patent Office, Office Action in JP2009-031600, mailed Jul. 23, 2013.

Mexican Patent Office, Office Action in Mexican Patent Application No. MX/a/2009/001768, dated Sep. 5, 2013, including an English-language summary (5 pages).

Mexico Patent Office, Office Action in Mexican Patent Application No. MX/a/2009/001768, dated Oct. 28, 2014.

\* cited by examiner

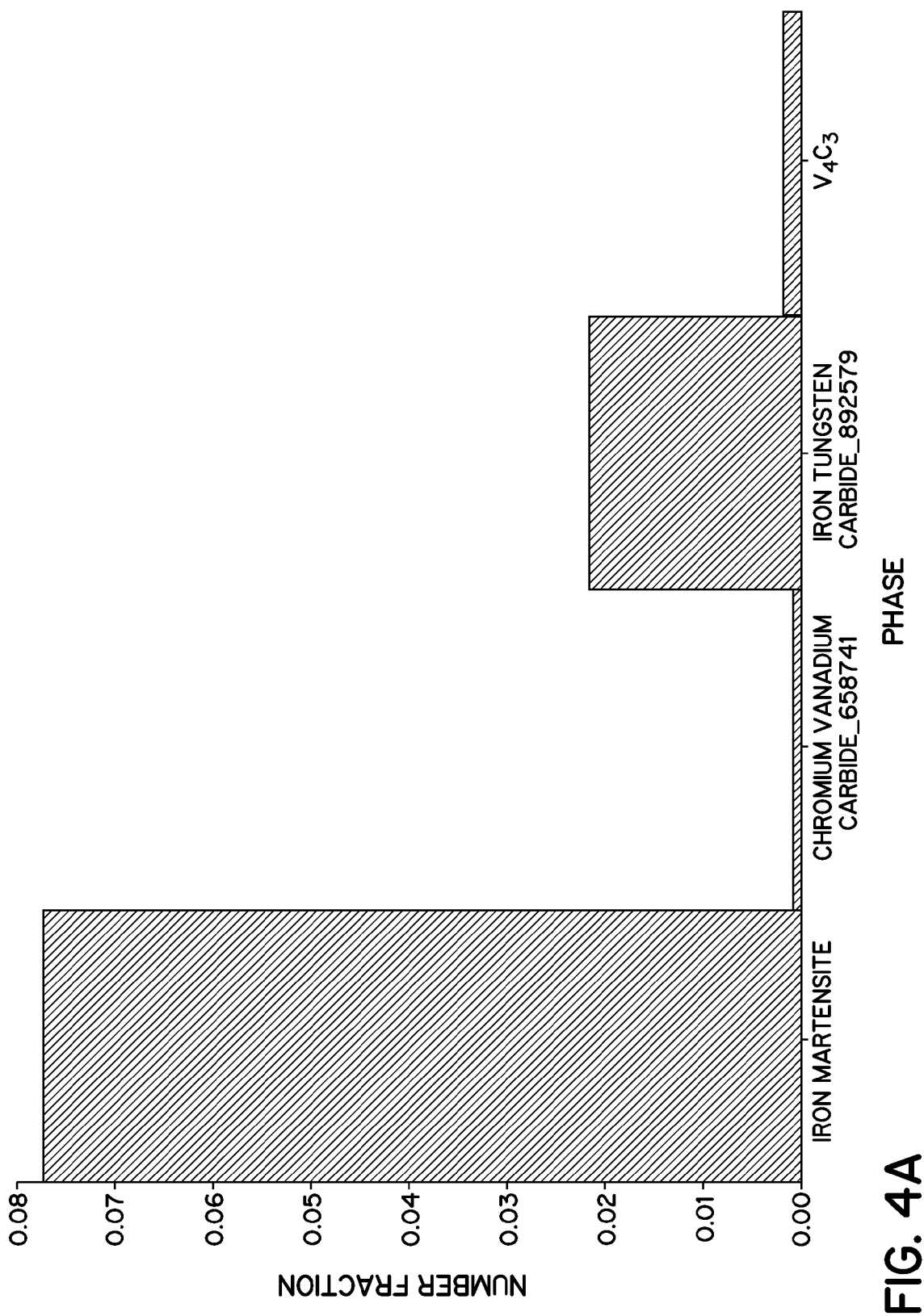

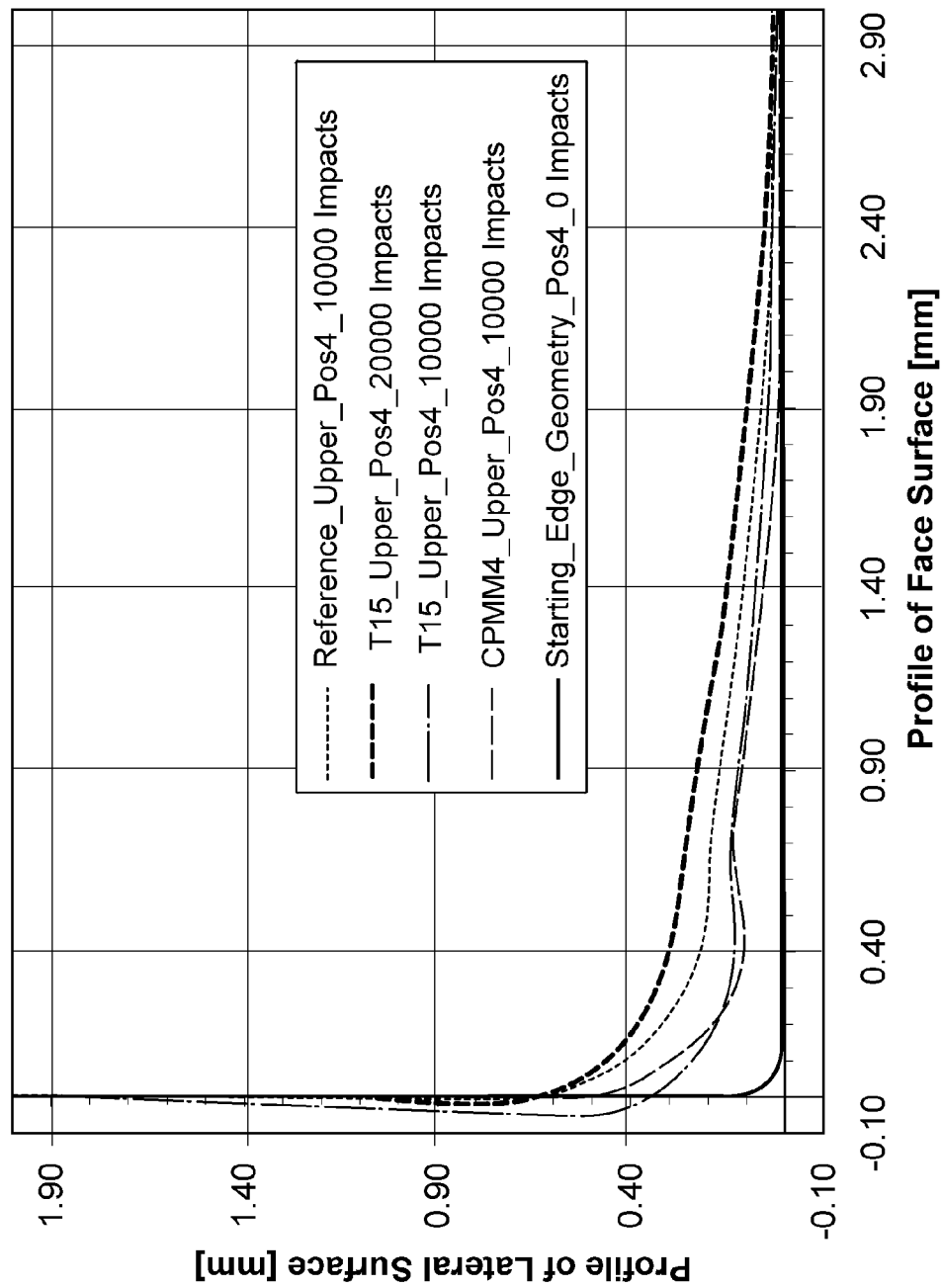
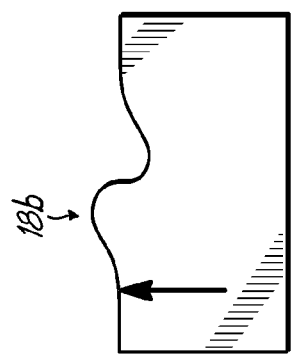
FIG. 13A
FIG. 13B

METHODS OF THERMO-MECHANICALLY PROCESSING TOOL STEEL AND TOOLS MADE FROM THERMO-MECHANICALLY PROCESSED TOOL STEELS

CROSS-REFERENCE TO RELATED APPLICATIONS

This application is a continuation-in-part of co-pending application Ser. No. 12/047,532, filed on Mar. 13, 2008, which claims the benefit of U.S. Provisional Application No. 60/896,729, filed on Mar. 23, 2007, the disclosure of each of which is hereby incorporated by reference herein in its entirety. This application also claims the benefit of U.S. Provisional Application No. 61/029,236, filed Feb. 15, 2008, which is hereby incorporated by reference herein in its entirety.

BACKGROUND

The invention relates to thermo-mechanical processing of tool steel, methods of forming tools using thermo-mechanically processed tool steel, and tools used in metal-forming and metal-cutting applications.

Among the various grades of commercially available carbon and alloy steels, tool steel grades are commonly used in applications wherein the tools undergo severe stresses, impact, and/or wear. Tool steels are generally characterized by a distinctive hardness, resistance to abrasion, an ability to hold a cutting edge, and a resistance to deformation at elevated temperatures. Consequently, tool steel finds widespread use in metal-forming and metal-cutting applications, inspection equipment and gages, and wear/impact components in machine tools.

Various types of tools are used in metal-forming and metal-cutting applications such as machining, piercing, coining, drawing, powder compaction, metal engraving, pin stamping, and the like. In particular, punches and dies represent types of metal-forming tools used to pierce, perforate, and shape metallic and non-metallic workpieces. Cutting tools and inserts represent types of metal-cutting tools used in machining applications to shape metallic and non-metallic workpieces. Plug gages, thread gages, pipe gages, ring gages, and setting disks represent types of tools used in inspection applications. Machine slides and gibs represent types of wear and impact components used in machine tools.

Punches and dies are subjected to severe and repeated loading during their operational life. In particular, punches tend to fail during use from catastrophic breakage induced by the significant stresses experienced during their use. The demands on metal-forming tools become more severe with the introduction of workpieces constructed from steels having higher strength to weight ratios, such as ultra-high strength steels (UHSS), advanced high-strength steels (AHSS), transformation induced plasticity (TRIP) steels, twinning induced plasticity (TWIP) steels, nano steels, and martensitic (MART) steels. For example, the automobile industry is migrating toward the more frequent use of these types of high-strength, low-weight steels for vehicle body structures.

What is needed, therefore, are methods of thermo-mechanically processing tool steels to improve the mechanical properties thereof and tools formed by thermo-mechanical processing that have improved mechanical properties.

SUMMARY

In one embodiment, a method of thermo-mechanically processing a preform composed of tool steel is provided. The tool steel has a martensitic start temperature and a stable austenitic temperature. The preform has a region containing austenite, the region including an outer surface and a plurality of outer dimensions for the outer surface. The method comprises establishing at least the region of the preform at a process temperature between the martensitic start temperature and the stable austenitic temperature. While the region of the preform is at the process temperature, the region is deformed to change at least one of the outer dimensions of the region and to modify the microstructure of the region over a depth extending from the outer surface to a depth of 1 millimeter or more beneath the outer surface. After the region is deformed, the region is cooled to room temperature.

In another embodiment, a tool for use in a machine to modify a workpiece is provided. The tool comprises a member composed of a tool steel. The member has an outer surface defining a first portion configured to be coupled with the machine and a second portion adapted to contact the workpiece. The member includes a first region that extends from the outer surface to a depth of greater than 1 millimeter and a second region separated from the outer surface by the first region. The first region includes a plurality of grains having a distribution of misorientation angles having an average misorientation angle of greater than about 34°, an average grain size that is at least 10% smaller than the second region, and has a different grain orientation than the a plurality of grains in the second region.

BRIEF DESCRIPTION OF THE DRAWINGS

The accompanying drawings, which are incorporated in and constitute a part of this specification, illustrate embodiments of the invention and, together with the brief description given above and a detailed description of the embodiments given below, serve to explain the principles of the embodiments of the invention.

FIGS. 4A, 4B, and 4C are graphical representations of measurements of the phases present, a distribution of misorientation angles of the grains, and a pole figure, respectively, of one exemplary embodiment of the present invention made of M2 tool steel.

FIGS. 12A, 13A, 14A, and 15A are graphical views illustrating a comparison of wear measurements of a profile of a cutting edge of exemplary tools of the present invention and the cutting edge of a tool made of a reference material each having the configuration depicted in FIG. 11C.

FIGS. 12B, 13B, 14B, and 15B are plan views of the tools of FIG. 11C that illustrate the measurement locations for the wear profiles provided in the graphs of FIGS. 12A, 13A, 14A, and 15A, respectively.

DETAILED DESCRIPTION

Figure 1:
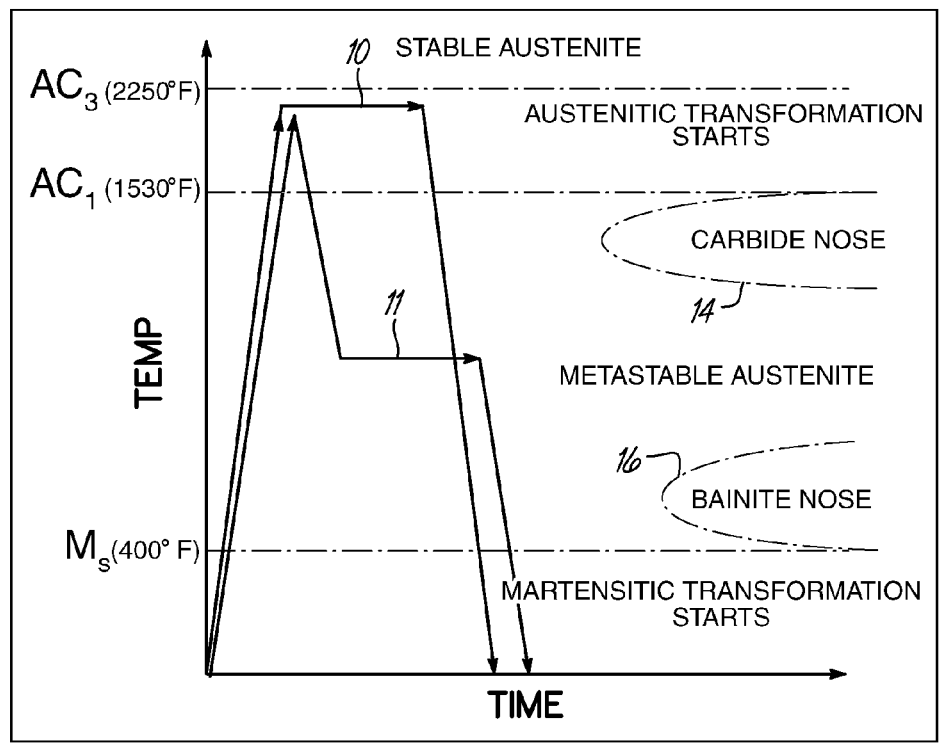
FIG. 1 is a graphical representation of exemplary time-temperature relationships for thermo-mechanical processing M2 AISI tool steel in accordance with embodiments of the invention.

In accordance with one embodiment of the invention, one method of making a tool includes manufacturing a preform from tool steel, where at least a region of the preform is thermo-mechanically processed. The region of the preform typically includes a substantial volume of tool steel or a bulk portion of the preform. For a cylindrical preform geometry, for example, the thermo-mechanically processed region processed with a radial-forging or a plain-strain forging process may incorporate an outer 60% of the volume with an inner volume of the remaining portion of tool steel being relatively unaffected by the process. Thus, for a simple preform geometry, the volume of the region may encompass at least an outer volume of one cross section of the preform. The region may extend at least partially across or fully across the cross-sectional area. Thus, in this embodiment, the outer volume or modified region extends from an outer surface of the region to a depth greater than at least 0.039 inch (1 mm), though the dimensions of the volume may be such that the depth may extend deeper into the preform. However, the depth of the region need not be uniform, rather a depth in one portion of the region may be less than 0.039 inch (1 mm) but a depth in another portion extends to a to greater than 0.039 inch (1 mm).

While the modified region is described above as an outer volume in the form of a layer around an inner volume, the modified region may be an irregular shaped region. This may be the case, for example, where the exterior surface of the preform has one geometrical shape prior to deforming but is then deformed by changing at least one of the outer dimensions of the region to form an object with a different shape. For example, deforming may include a change in one or more of the cross-sectional area or another outer dimension which may increase or decrease a length of the region. One skilled in the art will observe that the volume of material processed may depend on numerous other factors including, but not limited to, the size and shape of the preform as well as the capability and type of the deforming equipment. Generally, as the load capacity of the forging equipment increases and the size of the preform decreases, the deformed region may incorporate a greater portion, if not all, of the preform. Therefore, unlike surface treatment operations, such as shot peening and the like, embodiments of the present invention are not limited to forming thin surface layers that are constrained to follow the part's previously-established contour. Further, embodiments of the present invention deform a greater portion of the tool steel and, in some embodiments, determine the preform's contour or outer surface dimensions. In this respect, regions of the preform may be measured across thicknesses of the bulk of the preform or tool and the shape of the preform may be unrelated to the final shape of the tool.

In addition to influencing the volume of tool steel processed, the geometry or shape of the preform before thermo-mechanical processing may influence the final microstructure. For example, the shape of the preform may influence or determine the orientation of the grains, as well as, the characteristics of the microstructure in the thermo-mechanically processed region. One skilled in the art will appreciate that the tool steel preform may be one of a plurality of configurations having any number of cross-sectional shapes, such as bar stock having a circular, rectangular, or polygonal cross section, or stock material having a more complex shape and cross-section. The determination of preform geometry may be developed based on historical experience, tooling requirements, and/or process limitations. For instance, the geometry of the preform may be selected based upon the type of process employed and the targeted, final geometry of the tool.

While the temperature of the region is held in the temperature ranges described below in accordance with different embodiments of the invention, the region is subjected to deformation. In embodiments of the invention, the amount of deformation is sufficient to improve the mechanical properties of the deformed region. The amount of deformation may be quantified by calculation of a reduction ratio, which is defined as the relative reduction in cross-sectional area due to thermo-mechanical processing. The improvement in properties of the region is thought to be proportional to the amount of deformation. By way of example and not limitation, a reduction ratio of as little as 20% may result in measurable improvement in the mechanical properties of the region. The amount of deformation that yields measurable improvement in mechanical properties is believed to be limited only by dynamic recrystallization of the tool steel. In other words, the amount of deformation may be kept below a threshold effective to cause the microstructure to dynamically recrystallize. If the deformed microstructure recrystallizes, a measurable decrease in the mechanical properties compared to an unrecrystallized microstructure may be observed. The decrease in specific mechanical properties may be at least about 20%. However, even though a decrease may be observed, the mechanical properties may be improved in comparison with a tool prepared by heat treating the tool steel above temperature ranges specified, as will be described in more detail below. One skilled in the art will appreciate that, in addition to the amount of deformation, dynamic recrystallization is contingent upon on the composition of the tool steel and the temperature at which deformation occurs.

As set forth above, thermo-mechanical processing includes plastically deforming the tool steel preform while the tool steel preform is held at an elevated temperature. Suitable processes capable of plastically deforming the preform include, but are not limited to, forging processes such as radial forging, ring rolling, rotary forging, swaging, thixoforming, ausforming, and warm/hot upsetting although other suitable deformation processes may be used. For example, techniques may also include those where the principle deformation direction is not substantially perpendicular to a longitudinal axis of the preform. As mentioned above, other techniques, such as shot peening while at an elevated temperature, create very shallow deformation and are therefore excluded as a deeper plastic deformation is required to provide the requisite improvement in mechanical properties.

One such process is plane-strain forging, which produces primarily radial and circumferential plastic deformation of the tool steel preform. Thus, plane-strain forging may limit grain elongation in a direction that is perpendicular to applied load. The preform may exhibit substantially uniform distribution of mechanical properties along its length and around its periphery as a result. Accordingly, in one embodiment, plane-strain forging includes plastic deformation processes that produce little, if any, grain elongation in a particular direction. However, any combination of the above-mentioned processes capable of plastically deforming the preform may be used when thermo-mechanically processing the tool steel preform.

In yet another embodiment, an existing tool may serve as the preform. For example, in addition to an unused tool, the existing tool may include a used tool, a damaged tool, or a broken tool. The existing tool is thermo-mechanically processed, as described herein, in order to remanufacture or reprocess the tool to restore its utility.

As provided above, thermo-mechanical processing includes plastically deforming a region of the preform while the region is held at an elevated process temperature. The temperature of the preform during deforming may be established by cooling the preform from higher temperatures. Such a process may include, by way of example only, casting a billet or preform of the tool steel from melted raw materials, cooling the cast preform to a lower process temperature, and deforming it at the process temperature. Alternatively, the preform may be brought to the process temperature at which deforming takes place by heating the preform from a temperature at or near room temperature, as described in more detail below.

In particular, and with reference to FIG. 1, the preform is deformed at a process temperature that is above a start temperature of the martensitic transformation ($M_S$) of the tool steel (a martensitic start temperature) but below a stable austenitic temperature ($AC_3$) of the tool steel when the preform contains austenite. $M_S$ is the temperature at which transformation of austenite to martensite initiates during cooling, and $AC_3$ is the temperature at which transformation of ferrite to austenite is completed during heating.

In addition, as is apparent in FIG. 1, the austenitic start temperature ($AC_1$) represents the temperature at which austenite starts to form during heating. One skilled in the art will appreciate that $M_S$, $AC_1$, and $AC_3$, are each dependent on the particular composition of the tool steel. Accordingly, any instance set forth herein where $M_S$, $AC_1$, or $AC_3$ are referenced together with a specific temperature is not intended to restrict the definitions thereof to that particular temperature.

In view of the temperatures defined above and according to one embodiment, when the tool steel preform is at a temperature between $M_S$ and $AC_3$ and when the region contains austenite (e.g., metastable austenite), all or a portion of the tool steel preform is processed, i.e., the tool steel preform is plastically deformed or forged. As a consequence, the deformed region of the tool steel preform has certain improved mechanical properties that are described below. For example, improvement in the impact strength or toughness of the deformed region may be at least about 20% greater, and, in a further example, may be at least 50% greater than deforming the preform above $AC_3$ when the microstructure is predominately stable austenite.

As introduced above, in one embodiment, the method includes heating the tool steel preform into a temperature range such that at least a portion of the preform contains austenite. One skilled in the art will observe that many different temperature profiles may be utilized to bring the tool steel preform to within the above-mentioned temperature ranges prior to deforming. By way of example only, and with reference to FIG. 1, the tool steel preform may be heated from a temperature below $M_S$ to a process temperature (labeled 10) above $AC_1$. In this example, the temperature is about 1530° F. (about 832° C.) and $AC_3$ is about 2250° F. (about 1232° C.). The tool steel preform may then be deformed while it is held at a process temperature between $AC_1$ and $AC_3$.

Another temperature profile may include heating the tool steel preform from a temperature below $M_S$ to a temperature between $AC_1$ and $AC_3$ and then cooling the tool steel preform to a process temperature above $M_S$ (labeled 11) before deforming it. In yet another embodiment shown in FIG. 1A, the temperature profile may include heating the tool steel preform to above $AC_3$ and then cooling the tool steel preform to a process temperature (labeled 12) between $AC_1$ and $AC_3$ or to a process temperature (labeled 13) between $M_S$ and $AC_1$ before deforming it.

Figure 1A:
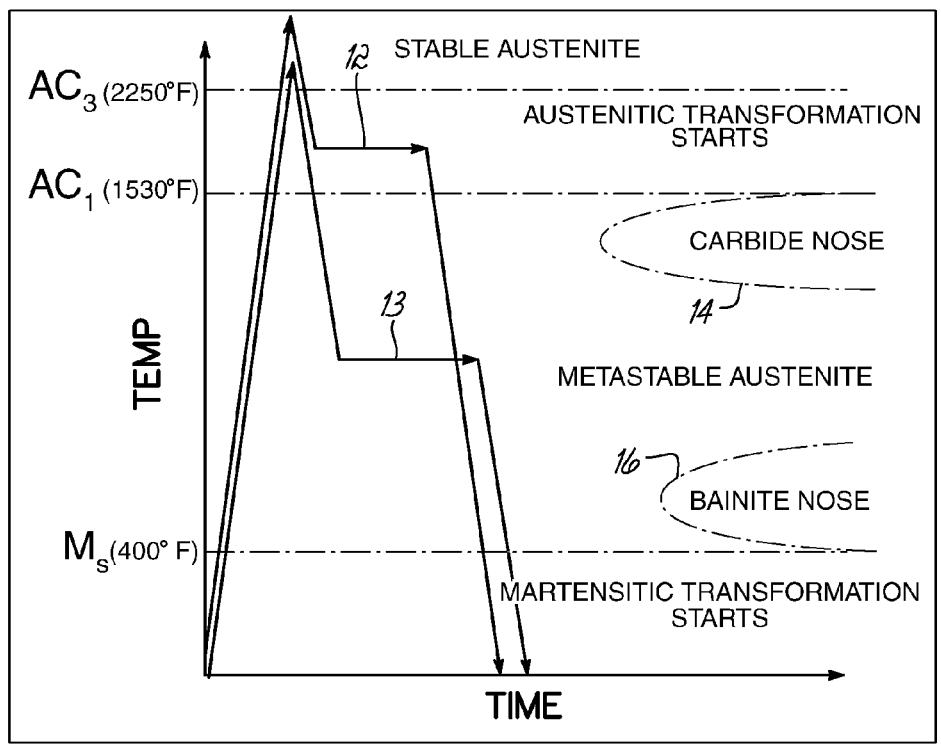
FIG. 1A is a graphical representation of other exemplary time-temperature relationships for thermo-mechanical processing tool steel in accordance with embodiments of the invention.

The process temperature during deforming may increase, decrease, or remain substantially the same, though the temperature of the region remains between $AC_3$ and $M_S$. As shown in FIGS. 1 and 1A, the temperatures (e.g., at 10, 11, 12, and 13) at which deforming takes place are depicted as horizontal lines. While a horizontal line may represent an isothermal condition, one skilled in the art will appreciate that some variation in the actual process temperature occurs. For example, the actual process temperature of the tool steel preform may vary by ±50° F. (±28° C.) during deforming. Controlling the temperature to maintain the region at a substantially isothermal condition may entail intentionally adding or removing heat via a closed-loop temperature feedback control system.

However, a temperature increase or decrease may occur during deforming. The temperature increase or decrease may be intentional or a result of not controlling the temperature during deforming. For example, in some embodiments, the temperature of the preform may increase by as much as 150° F. (83° C.) due to the rate at which energy is added to the preform by the deformation. The additional energy is transformed into heat, and, if uncompensated by sinking or removing heat, that elevates the temperature of the region. Thus, the process temperature may increase or decrease such that the temperature of the region may start at a temperature above $AC_1$ but end at a temperature below $AC_1$ or start at a temperature below $AC_1$ and end at a temperature above $AC_1$. In other embodiments, the region may be intentionally cooled to reduce the temperature of the region while deformation is occurring. However, it is noted that if the preform temperature changes substantially during the deformation process, dynamic recrystallization of grains may reduce the impact strength and toughness of the region. Hence, an isothermal process, i.e., holding the actual process temperature of the tool steel preform substantially constant during deformation, may maximize strength, toughness, and other mechanical properties of the region, as described below.

With continued reference to FIGS. 1 and 1A, while a variety of heating and cooling processes may be utilized, process temperature and process time are controlled to avoid a carbide nose 14 or a bainite nose 16. One skilled in the art will appreciate that at temperatures below $AC_1$, the tool steel may precipitate carbide or bainite if the region is held too long at temperatures in these ranges. By way of example, an M2 AISI tool steel preform may be deformed over a period of at least 2 minutes without substantial carbide or bainite phase formation. However, the amount of time that the preform may be held at temperatures in this range is dependent on at least the composition of the tool steel and the temperature, as well as other factors.

Following thermo-mechanical processing, the preform is cooled to a lower temperature. Cooling or quenching may be achieved by either forced air convection or by holding the region at intermediate temperatures prior to cooling the preform to room temperature. One skilled in the art will appreciate that quenching may include other cooling methods or mediums including, for example, water, or oil quenching. By way of additional example, the region may be subject to cryogenic treatment, where the region is cooled in one or more stages to temperatures of between about −150° F. (about −101° C.) and about −300° F. (about −184° C.) to convert a larger percentage of the retained austenite to martensite. Cryogenic treatment may be achieved with liquid nitrogen, for example, and may be used primarily with A2 and D2 tool steels, though other tool steels containing substantial percentages of retained austenite may benefit from this type of treatment. The rate of quenching is greater than the critical cooling rate of the tool steel, i.e., the minimum rate of continuous cooling for preventing undesirable transformations, such as, the carbide nose 14 and the bainite nose 16. Accordingly, the cooling rate is sufficient to avoid substantial transformation of metastable austenite into undesired decomposition products, such as carbide or bainite. Faster cooling rates may also be utilized though faster cooling rates are limited to those that do not thermal shock the region or otherwise distort the tool steel preform.

Further, in one embodiment, cooling is followed by one or more tempering processes. For example, tempering may include heating the region to a temperature between about 850° F. (about 454° C.) and about 1000° F. (about 537° C.) for between about 45 minutes to about 60 minutes. Tempering modifies the microstructure by converting retained austenite to martensite. As is known in the art, multiple tempering cycles may be used to convert the retained austenite. One skilled in the art will understand that tempering may include heating to a higher or lower temperature for shorter or longer periods of time depending on the composition of the tool steel, the geometry and size of the preform, the amount of retained austenite tolerated, and the number of tempering treatments used. According to one embodiment, following quenching, the region is not heat treated at or above $AC_3$ prior to tempering. Furthermore, the region may not be heated to above any temperature that the region experienced during deformation. In other words, the preform may be reheated, however, the temperature during any subsequent reheat does not substantially reduce or alter strain or dislocation build-up as the result of deforming the austenite in the region at temperatures between the stable austenitic temperature and the martensitic start temperature.

In another embodiment, the method further includes finishing the tool steel preform into a tool after the thermomechanical deformation process. Finishing may include a material removal process to produce a final predetermined shape and/or surface finish. For instance, conventional finishing processes may include machining, grinding, sanding/polishing, or a combination thereof to prepare the tool for use. However, finishing may require only a small amount of material removal to form the preform into the tool. For example, deforming may include a near net-shape forging process such that, following deforming, minor subsequent processing, if any, of the preform is required to make the tool.

One or more secondary processes may follow cooling or finishing of the tool. Secondary processes include forming a coating on the tool or further modifying the surface of the tool in some manner. Exemplary secondary processes include thermal spraying or cladding the deformed region of the tool or the entire tool with wear resistant material. Other secondary processes include applying a coating on the working surface of the tool by a coating technique including, but not limited to physical vapor deposition (PVD), chemical vapor deposition (CVD), or salt bath coatings. Other surface modifications techniques include ion implantation, laser or plasma hardening techniques, nitriding, or carburizing, which may be used to modify a surface layer at the working surface of the tool. It will be appreciated that various different secondary processes may be used in any combination to further modify the tool.

As set forth above, the preform is composed of a tool steel. Tool steels represents a class of steels from which tools used for cutting, forming, or otherwise shaping another material are made. The tool steel may exhibit hardening with heat treatment and may be tempered to achieve desired mechanical properties. For example, the preform can be fabricated from various different classifications of tool steels like cold-work, hot-work, high-speed tool steel grade materials, or proprietary tool steel grades. In particular, tool steels are iron-carbon (Fe—C) alloy systems with a carbon content within a range from about 0.35 wt. % to about 1.50 wt. %, and in a further example, within a range from about 0.85 wt. % to about 1.30 wt. % with other carbon contents contemplated depending on the carbide phases desired, if any.

Tools steel often contain additions of carbide forming elements, such as, vanadium (V), tungsten (W), chromium (Cr), molybdenum (Mo), or combinations thereof. Depending on the alloying additions, one or more carbide phases, like $M_6C$, $M_2C$, $M_{23}C_6$, $M_7C_3$, or $M_4C$, may precipitate, although other types of carbides may form as is known in the art. With few exceptions, tool steels do not contain intentional additions of nickel (Ni). Nickel is a known austenitic phase stabilizer. Tool steels may, however, contain trace quantities (0.3 wt. % max) of this element.

Table 1 shows the nominal composition in weight percent of exemplary tool steels (the balance of the tool steel being iron (Fe)) that may be used to fabricate a tool according to embodiments of the invention. By way of example, $AC_3$ of the tool steels in Table 1 fall in the range of between about 2100° F. (about 1149° C.) and about 2400° F. (about 1316° C.), $AC_1$ temperatures fall into the range of between about 1380° F.

(about 749° C.) and about 1680° F. (about 915.6° C.), and $M_S$ fall in the range of about 320° F. (about 160° C.) and about 480° F. (about 249° C.).

TABLE 1

| AISI | DIN | JIS | UNS | C | Cr | V | W | Mo | Co |
|---|---|---|---|---|---|---|---|---|---|
| A2 | 1.2363 | G4404 SKD12 | T30102 | 1.00 | 5.00 | — | — | 1.00 | — |
| D2 | 1.2201 | G4404 SKD11 | T30402 | 1.50 | 12.00 | 1.00 | — | 1.00 | — |
| H-13 | 1.2344 | G4404 SKD61 | T20813 | 0.35 | 5.00 | 1.00 | — | 1.50 | — |
| M2 | 1.3341 | G4403 SKH1 | T11302 | 0.85~1.00 | 4.00 | 2.00 | 6.00 | 5.00 | — |
| M4 | — | G4403 SKH54 | T11304 | 1.30 | 4.00 | 4.00 | 5.50 | 4.50 | — |
| S7 | — | — | T41907 | 0.50 | 3.25 | 0.25 | — | 1.50 | — |
| T15 | — | G4403 SKH10 | T12105 | 1.57 | 4.00 | 5.00 | 12.25 | — | 5.00 |
| M42 | S-2-10-1-8 | G4403 SKH59 | T11342 | 1.08 | 3.75 | 1.1 | 1.5 | 9.5 | 8.00 |

In addition, the preform may also comprise a powdered metal material or, in particular, a powdered metal tool steel. Powdered metal tool steel preforms are generally made by physically grinding or otherwise making a bulk piece of tool steel into many small individual particles, injecting the powdered metal into a mold or passing the powdered metal through a die to produce a weakly cohesive compact, and sintering the compact as is known in the art. Tools formed from powdered metal tool steels are often characterized as having isotropic properties as a result of their method of manufacture. However, when processed according to embodiments disclosed herein, the properties of the tools are improved relative to powdered metal tools processed according to conventional sintering and/or hot isostatic pressing methods.

Processing a tool steel, as disclosed herein, modifies the microstructure of the tool steel. As set forth above, the tool steel is deformed while it contains austenite. As is known in the art, austenite has a face-centered cubic (fcc) crystal structure, and martensite has a body-centered tetragonal (bct) crystal structure. Because of its higher number of slip planes, austenite is considered by a person having ordinary skill in the art to have a higher ductility than martensite. Any austenite that forms above $AC_3$ is generally recognized by those of ordinary skill in the art to be stable. That is, at temperatures above $AC_3$, austenite generally does not decompose into other phases. At temperatures below $AC_3$, austenite is known to be unstable and is often termed metastable as it decomposes to other phases if held for prolonged periods at temperatures between $AC_3$ and $M_S$. The austenite present in the temperature ranges described herein is metastable. Although not wishing to be limited by theory, metastable austenite, in spite of having the same crystalline structure as austenite, is believed to retain strain history.

Plastic deformation of the preform containing metastable austenite results in a microstructure that is different than quenching from between these temperatures alone or forging the preform at temperatures above $AC_3$ and then quenching. The resulting microstructure and material properties of the deformed region may be dependent on the type of tool steel, the type of thermo-mechanical processing, the amount of strain induced into the austenite, the rate at which strain was induced, and the temperature at which the thermo-mechanical process was performed. For example, thermo-mechanical processing of metastable austenite at temperatures between $M_S$ and $AC_1$ may produce a microstructure that is different than thermo-mechanical processing of metastable austenite at temperatures between $AC_1$ and $AC_3$. However, in any case, the deformed region exhibits improved mechanical properties.

As a result of deforming austenite in these temperature ranges, in one embodiment, the microstructure is fine grained. For example, the average size of the grains or crystals in the deformed region may be at least 10%, and, in a further example, may be at least about 25% less than those observed in tools made with conventional processes. In some embodiments, the fine grained microstructure facilitates a uniform precipitation of carbide phases along the more numerous grain boundaries during quenching or another process.

In addition, another microstructural feature may include an increase in the dislocation density. As is known in the art, dislocations are linear defects in a crystalline solid, such as in austenite. One exemplary dislocation is formed by an extra half-plane of atoms within a crystal, though other types of dislocations are known and many types of dislocations are known to simultaneously form in a single crystal. Furthermore, the grain boundary may be represented by one or more dislocations. In polycrystalline materials, like the tool steel material of the preform, the grain boundaries that exist between adjacent crystals are regions of misfit between the crystalline lattice of one grain and the crystalline lattice of an adjacent grain. As the degree of misfit or the misorientation angle between adjacent grains increases from zero degrees, where the crystal structure of adjacent grains align, the density of dislocations at the grain boundaries increases. Measurement of misorientation angle between grains is, therefore, a measurement of the dislocation density, particularly dislocation density at the grain boundaries. Deforming the region of the tool steel preform increases the misorientation angle between the grains to a greater degree than deforming a region of similar composition by hot forging above $AC_3$ or heat treating according to conventional methods. The martensitic grains following deformation, quenching, and tempering may be misoriented at an average angle, for example, of greater than about 34°, and in a further example, the martensitic grains are on average misoriented by at least about 40°. In addition, in one embodiment, the density of dislocations of the region is at least 25% greater than hot-forged or heat-treated parts of convention processes. The dislocation density and grain size may be measured by using electron backscatter diffraction (EBSD) or X-ray diffraction (XRD) techniques, for example. In addition to improving the impact strength of the deformed region, locations of high dislocation density may provide nucleation points for the precipitation of carbide phases during deformation or in a subsequent heating or cooling operation.

The deformed region may also exhibit a preferred orientation of grain structure. In particular, in a cross-sectional view of the deformed region, the grains may be elongated or have another shape such that when arranged or oriented relative to one another, the grains collectively provide a preferential flow or directionality to the microstructure. The direction of preferential orientation may be in a direction relative to one of the surfaces of the tool, relative to a tool axis, or relative to another region also having a preferential orientation. In essence, the preferential orientation may be in any direction. In one embodiment, the preferential orientation of the grains in the deformed region follows the surface contour of a working surface of the tool. For example, the preferential orientation may follow the surface contour formed by two intersecting surfaces that define an edge. The grain structure may be substantially parallel to each surface while transitioning from a first direction, which is parallel to one surface, to a second direction, which is parallel to the second surface, in an area proximate the edge. The initial shape of the preform, any carbide or alloy banding present in the preform prior to processing, and the processing technique may be major factors in determining the preferential orientation of the grains in the deformed region.

Accordingly, in one embodiment, the deformed region is characterized by a combination of two or more of the above microstructural features. For instance, the deformed region may have a grain size distribution with a small average grain size, and the grains may be preferentially oriented relative to a working surface of the tool or to a tool axis. Further, the region may be characterized as having a relatively high dislocation density. In one embodiment, the region may be further characterized by having a finer, more uniformly distributed carbide phase or phases located at the grain boundaries and at locations of high dislocation density. Moreover, the characteristics may not vary significantly from one location to another within the deformed region, though significant variation may exist between two or more separately formed regions. For instance, portions of the preform may have relatively high dislocation density regions separated by a relatively low dislocation density region. The variation of dislocation density between regions may be due to different processes used (e.g., radial forging as compared to plane-strain forging), differing forging rates or intensities, different temperatures, etc.

Without being bound by theory, the inventors believe that the external energy from thermo-mechanical processing may be used to form a fine grain structure, provide an orientation to the grain structure, increase dislocation density, or produce a combination thereof within the metastable austenite phase. Following quenching, the deformed metastable austenite beneficially affects the microstructure that ultimately forms. In addition, external energy from thermo-mechanical processing may facilitate precipitation of carbide phases in the microstructure. For example, thermo-mechanical processing at temperatures less than $AC_1$ are believed to decrease the solubility of carbon in metastable austenite and, thus, promote carbide precipitation. In a related embodiment, the carbide phases may precipitate at the grain boundaries and/or dislocation sites during deforming or during cooling or during both deforming and cooling. Accordingly, tool steel preforms processed below $AC_1$ exhibit greater strengths, among other improved properties, in comparison with tool steel preforms processed above $AC_1$. Further, the increase in dislocation density in this temperature range is believed to be substantially higher in comparison with preforms thermo-mechanically processed at temperatures greater than $AC_1$.

As set forth above, the deformed region of the preform is characterized by improved properties as compared to conventional processes (e.g., heat treatment and/or hot forging above $AC_3$). Thus, a tool made from the tool steel preform may, for example, exhibit a longer useful life. Improved properties may include improvements in one or more of the impact strength (according to the Charpy test), toughness, hardness, or wear resistance or a combination thereof. By way of comparison, the impact strength of the deformed region of the preform of M2 AISI tool steel processed according to one embodiment of the present invention may be at least 50% greater than tools of similar composition that are deformed above $AC_3$ or heat treated without forging. In any embodiment, longer tool life may be attributed to enhanced resistance to impact, resistance to other stresses, or resistance to abrasive conditions that are experienced during use.

Figure 2A:
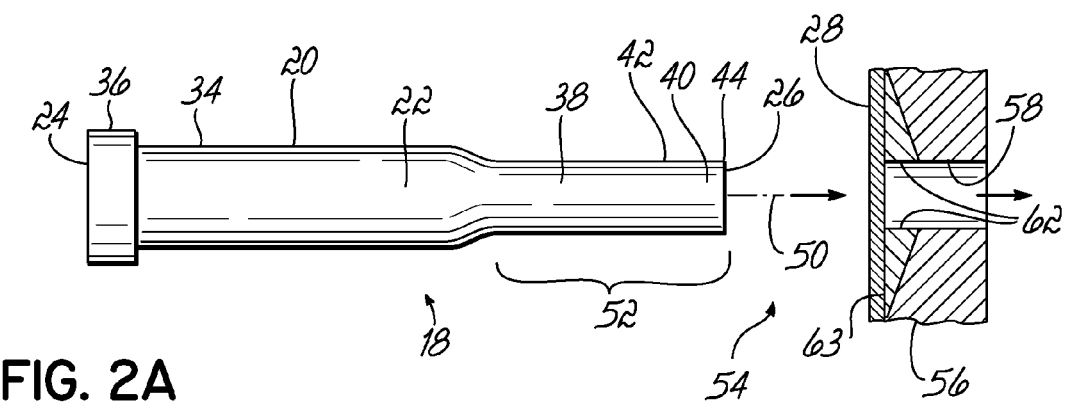
FIG. 2A is a side elevation view of a tool and a cross-sectional view of a corresponding die in accordance with a representative embodiment of the invention.
Figure 2B:
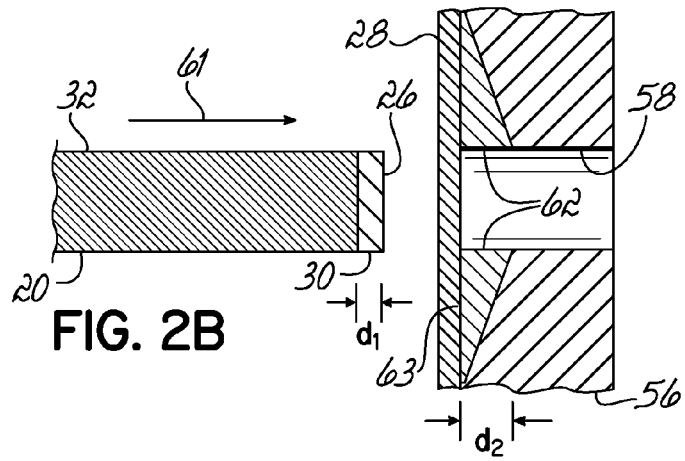
FIG. 2B depicts an enlarged cross-sectional view of the tool and die of FIG. 2A.

With reference to FIGS. 2A and 2B and in accordance with another embodiment of the invention, a tool 18 includes a member 20 having an outer surface 22 that generally includes a first portion 24 to be connected or coupled to a machine (not shown) and a second portion in the representative form of a working surface 26 that contacts a workpiece 28 when the tool 18 is used in metal-forming and metal-cutting applications. Further, the outer surface 22 encloses and defines an outer boundary of a bulk volume or mass of tool steel. As best shown in FIG. 2B, at least one region 30 is formed, as described herein, within the enclosed bulk volume. And, when the region 30 is not constituted by the entire bulk volume of the tool 18, the member 20 may have another region 32 that differs in one or more of the microstructural characteristics and, therefore, differs in the properties described above in comparison with region 30.

In one embodiment, with reference once again to FIG. 2A, the member 20 is elongated and the outer surface 22 defines a barrel or shank 34, a head 36 disposed at one end of the shank 34, and a nose or body 38 with a tip 40 disposed at an opposite end of the shank 34 from the head 36. The working surface 26 carried on the tip 40 joins a sidewall 42 of the tip 40 along a cutting edge 44. The cutting edge 44 defines a corner along which the sidewall 42 and working surface 26 converge. The cutting edge 44 and working surface 26 collectively define the portion of the tool 18 that contacts the surface of the workpiece 28. The workpiece 28 may comprise a material to be processed by the tool 18 in a metal-forming or metal-cutting application.

When viewed along a longitudinal axis or centerline 50 of the tool 18, the shank 34 and body 38 of the elongate member 20 have a suitable cross-sectional profile, such as, for example, a round, rectangular, square, or oval cross-sectional profile. The shank 34 and body 38 may have cross-sectional profiles of identical areas or the body 38 may have a smaller cross-sectional area to provide a relief region 52 between the shank 34 and body 38. In certain embodiments, the shank 34 and body 38 are symmetrical disposed about the centerline 50 and, in particular, may have a circular or round cross-sectional profile centered on the centerline 50.

The head 36 of the tool 18 has a construction appropriate for being retained with a tool holding device used with a metalworking machine like a machine tool or a press (not shown). In the exemplary embodiment, the head 36 is a flange having a diameter greater than the diameter of the shank 34. Instead of head 36, however, the tool 18 may alternatively include a ball-lock, a wedge lock, a turret, or another type of retaining structure for coupling the shank 34 of tool 18 with a tool-retaining device.

The tool 18, which has the construction of a punch in the representative embodiment, typically forms a component of a die set 54. The die set 54 further includes a die 56 containing an opening 58 that receives a portion of the tip 40 of tool 18. The die 56 and tool 18 cooperate, when pressed together, to form a shaped hole in a workpiece 28 or to deform the workpiece 28 in some desired manner. The tool 18 and the die 56 are removable from the metalworking machine with the tool 18 being temporarily attached by using a tool retention mechanism to the end of a ram (not shown).

The tool 18 moves generally in a direction 61 towards the workpiece 28 and with a load normal to the point of contact between the working surface 26 and the workpiece 28. The metalworking machine may be driven mechanically, hydraulically, pneumatically, or electrically to apply a load that forces the tool 18 into the workpiece 28. The tip 40 of tool 18 is forced under the high load imparted by the metalworking machine through, or into, the thicknesses of the workpiece 28 and into the die opening 58. The workpiece 28 is deformed and/or cut at, and about, a contact zone between the working surface 26 of tool 18 and the workpiece 28.

Tool 18 may have other punch constructions that differ from the construction of the representative embodiment. As examples, tool 18 may be configured as a blade, a heel punch, a pedestal punch, a round punch, etc. Although tool 18 is depicted as having a construction consistent with a punch in the representative embodiment, a person having ordinary skill in the art will understand that the tool 18 may have other constructions, such as a die, like die 56 (FIGS. 2A and 2B) or a stripper. In particular, tool 18 in the form of punch, die, or stripper may be applied in metal stamping and forming operations like piercing and perforating, fine blanking, forming, and extrusions or coining.

Tool 18 may also have the construction of a cutting tool, such as a rotary broach, a non-rotary broach, a tap, a reamer, a drill, a milling cutter, a trimming tool, etc. Tool 18 may be used in casting and molding applications, such as conventional die casting, high pressure die casting, and injection molding. Tool 18 may also be utilized in powder compaction applications used in pharmaceutical processes, nutraceutical processes, battery manufacture, cosmetics, confectionary and food and beverage industries, and in the manufacture of household products and nuclear fuels, tableting, explosives, ammunition, ceramics, and other products. Tool 18 may also be used in automation and part fixturing applications, such as locating or part-touching details.

With reference to FIG. 2B, the region 30 of the tool 18, a region 62 of the die 56, or both region 30 of the tool 18 and region 62 of the die 56 are formed or machined from a region of a preform (not shown) that has been thermo-mechanically processed, as set forth above. For example, the region 30 is often located proximate or includes the working surface 26 such that the region 30 is near or in direct contact with the workpiece 28 during operation of the tool 18. Similarly, region 62 of the die 56 is near or in direct contact with the workpiece 28 when the tool 18 and die 56 are used. Region 30 extends from the outer surface 22, e.g., the working surface 26, to a depth, $d_1$, of greater than 0.039 inch (1 mm). Similarly, in the die 56, the region 62 may be irregularly shaped but also extends from an outer surface 63 to a depth, $d_2$, of greater than 0.039 inch (1 mm).

However, beneficial performance may be observed when the region 30 or 62 is formed in other locations within the tool steel preform. These locations may be determined by factors incident to the operation in which the tool 18 is used or cost considerations used to balance the use of the tool 18 versus the cost of its manufacture. In any respect, the thermo-mechanically processed region 30 is characterized by high dislocation density, fine grain structure, preferred orientation of the grains or a combination thereof, as provided above. In one embodiment, high dislocation density, fine grain structure, preferred orientation of the grains, or a combination thereof may be related to the primary deformation direction during the thermo-mechanical processing.

The tool 18 may have multiple regions of high dislocation density, fine grain structure, preferred orientation of the grains, or a combination thereof. In embodiments with two or more regions, each region may be adjacent to the next within the tool steel preform. It will be appreciated that the orientation of the grains in one region may or may not be substantially aligned with any of the other regions or the axis of the tool 18. In yet another embodiment, the region of high dislocation density, fine grain structure, or the preferred orientation of the grains or a combination thereof extend substantially throughout the tool 18 rather than being confined to one or more portions thereof. In other words, the tool 18 may be machined or formed from a tool steel preform that has been previously thermo-mechanically processed according to embodiments herein.

Figure 3A:
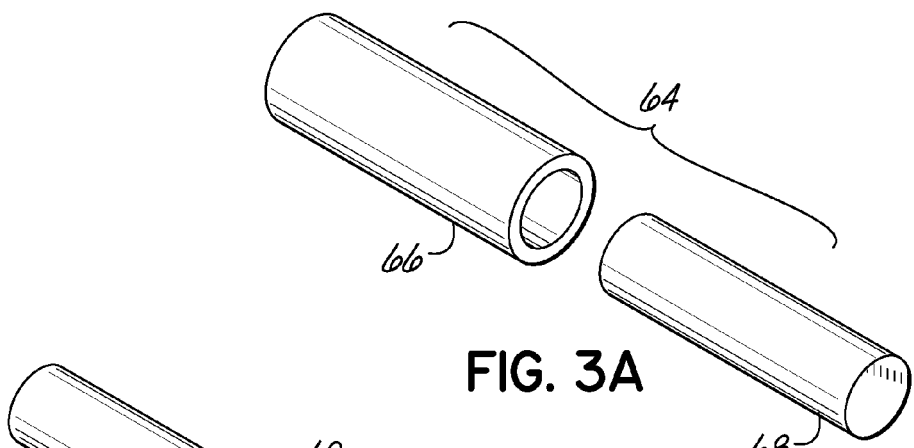
FIGS. 3A and 3B are perspective views of one embodiment of a preform comprising a shell and a core before and after deforming, respectively.
Figure 3B:
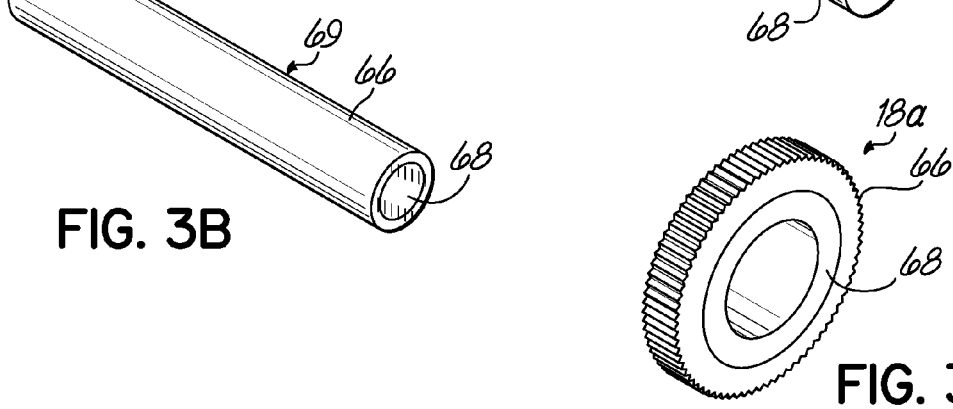
Figure 3C:
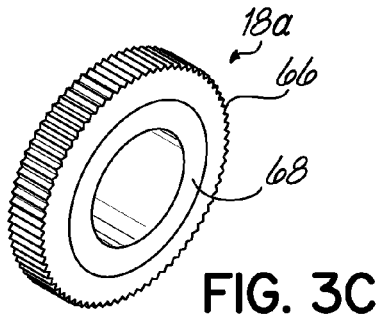
FIG. 3C is a perspective view of one embodiment of a tool made from the deformed preform of FIG. 3C.

With reference to FIGS. 3A and 3B, while embodiments of the invention are described and illustrated herein with reference to preforms composed substantially completely of tool steel, in other embodiments, a preform 64 may be in the configuration of a shell 66 made of tool steel having a core 68 made of a dissimilar steel. As shown in FIG. 3A, the core 68 may fill the entire void within the shell 66 or only a portion thereof depending on the application for the tool (not shown) made therefrom, among other variables. While the volume of tool steel in the shell 66 may be small when compared to the volume of the dissimilar steel, the shell 66 is greater than 0.039 inch (1 mm) thick such that the deformed region is at least 0.039 inch (1 mm) thick. The shell 66 is designed to form the working surface 26 of the tool (see FIG. 1A). The core 68 may form the remainder of the tool and may be designed to provide a complimentary mechanical property to the tool. By way of example only, the shell 66 may be a tube of tool steel, as shown in FIG. 3A. The core 68 may be a cylinder of another steel, such as, a low carbon or cold work steel, like D2, that is more economical. Following insertion of the cylindrical core 68 into the tubular shell 66, the preform 64 is heated and at least the shell 66 is deformed by swaging or radially forging in the temperature ranges described above. A deformed preform 69 following, for example, radially forging the shell 66 and the core 68 is shown in FIG. 3B. A tool 18a formed or machined from the deformed or forged preform 69 may be utilized in applications where, for example, transverse strength is needed, which may include gears (as shown in FIG. 3C) or gear-rolling or thread-rolling dies, to improve service life of the tool though the material costs of the tool are significantly reduced.

Further details of the invention will be described with reference to the following examples.

EXAMPLE 1

Eight tool steel preforms in the configuration of as-rolled bars having a diameter of 1.500 inches (3.81 centimeters) and a length of 48 inches (121.9 centimeters) and which are known in the art by the designations AISI M2, D2, and M4 were prepared according to one embodiment of the method disclosed herein.

To that end, the bars were heated above $AC_1$ to a temperature of 2100° F. (1149° C.) in a gas powered furnace. The temperature measurements were recorded using an infrared pyrometer calibrated in the range of operation. It is believed that at this temperature the microstructure in each of the bars is composed of austenite. Once the bars reached the target temperature, they were transferred individually (to avoid temperature loss during part transfer) to the inlet rolls of a 200 Ton 4-Hammer radial forging machine. The 1.500 inches (3.81 centimeters) diameter by 48 inches (121.9 centimeters) long bars were each radially forged into a bar having a diameter of 0.875 inches (2.222 centimeters) with four reductions. Each reduction took between approximately 15 to approximately 20 seconds (a total of at maximum 80 seconds per bar). The calculated effective reduction ratio was 66%. The processed bars were forced-convection, air cooled to room temperature.

During thermo-mechanical processing, it is known that hot metal will lose heat due to loss from convection and radiation. Therefore, in order to maintain the temperature of each bar within a narrow range of temperatures near the target temperature of 2100° F. (1149° C.), external heat and the internal heat from the deformation processes were used to compensate for any heat loss. Thus, forging was performed in a nearly isothermal condition. Furthermore, the temperature was monitored to ensure that any temperature change was negligible.

Figure 4B:
Figure 4C:
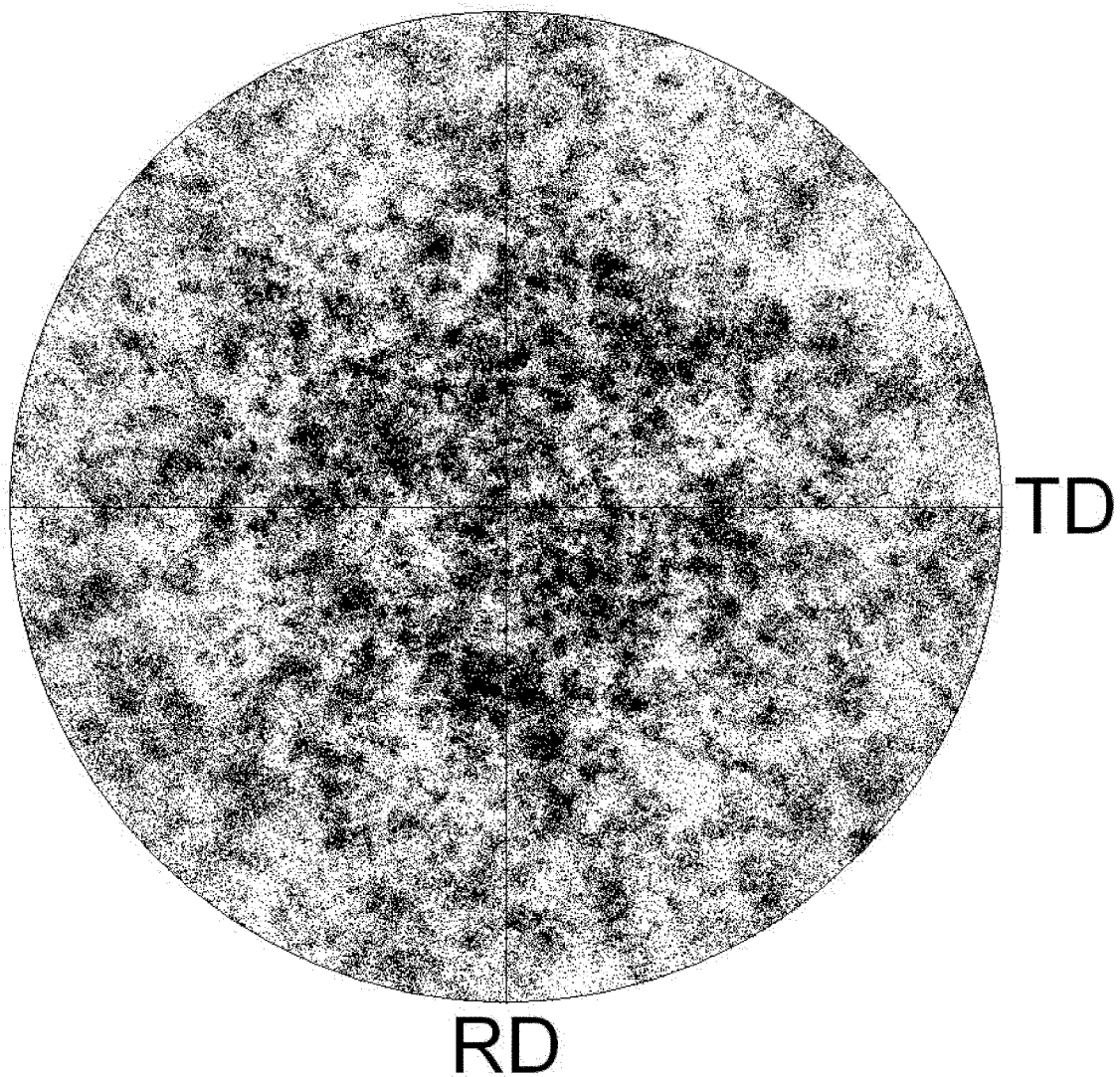

Small sections were cut from each bar during intermediate reductions for analysis. None of the samples were observed to exhibit any recrystallization. In addition, the phases present in each sample were determined, misorientation between grains was measured, and a pole figure was developed for the [001] plane of martensite for the transverse direction (TD) and radial direction (RD). The measurements were taken at a location that was one-half of the radius of the cross section of the bar or at about 0.22 inches from the center of an M2 tool steel bar following deformation and subsequent tempering. The phase identification was done on a Philips X'Pert X-ray Diffractometer. The phase analysis of one M2 bar of Example 1 is shown in FIG. 4A. In FIG. 4A, the number fraction of each phase was 0.771473 iron martensite, 0.00419837 chromium-vanadium carbide (658741), 0.219877 iron-tungsten carbide (892579), and 0.00445168 $V_4C_3$. EBSD scans were performed on a Field-Emission Environmental Scanning Electron Microscope (ESEM)-FEI/Philips XL30 ESEM-FEG with EBSD detector. The data was collected and mapped with XRD data using Orientation Imaging Microscopy™ (OIM™) data collection software. Misorientation graphs were generated by the OIM™ analysis software. A representative distribution of misorientation angles measured for the martensitic grains for one of the M2 tool steel bars of Example 1 is shown in FIG. 4B. The pole figure developed for this M2 bar is shown in FIG. 4C.

EXAMPLE 2

A few of the 0.875 inches (2.222 centimeters) diameter bars from Example 1 were reheated to above $AC_1$ to a temperature of 2100° F. (1149° C.). After the bars were heated above $AC_1$, the microstructure was believed to be composed of austenite. Once the bars reached the target temperature, they were individually transferred to the inlet rolls of the 200 Ton 4-Hammer radial forging machine. Each bar was radially forged while at a temperature of 2100° F. (1149° C.). In four reductions, the bar diameter was reduced from 0.875 inches (2.222 centimeters) to 0.640 inches (1.626 centimeters). This reduction in cross-sectional area amounted to a 47% effective reduction ratio in addition to the 66% reduction from the first four reductions of Example 1. The processed bars were force-convection, air cooled to room temperature. Several samples were cut from one bar at intermediate reductions to record the influence of strain. Like the samples from Example 1, recrystallization was not observed in any of the samples.

As before, the heat lost to the environment and the heat generated from the deformation were balanced in an attempt to maintain the bars at a constant temperature during thermo-mechanical processing. Temperature was monitored during the process and between reductions to ensure that the temperature change was negligible. It is therefore believed that all of the external energy was transferred to the preform to increase dislocation density and reduce the austenitic grain size.

The bars were then stress relieved at 1400° F. (760° C.) for four hours in a gas powered furnace and successfully processed through a bar straighter to minimize distortion.

EXAMPLE 3

Tool steel preforms in the configuration of as-rolled bars having a diameter of 1.500 inches (3.81 centimeters) and a length of 48 inches (121.9 centimeters) and known in the art by designations of AISI M2, D2, and M4 were prepared.

The bars were heated to a temperature of 2050° F. (1121° C.) in a gas powered furnace. The microstructure of the bars is believed to be composed of metastable austenite. As before, the temperature measurements were recorded using an infrared pyrometer calibrated in the range of operation. Once the bars reached the target temperature, each of the bars was pulled out of the furnace and placed on the inlet rolls of the 200 Ton 4-Hammer radial forging machine. The bars were then allowed to air cool to a process temperature of between about 1100° F. (about 593° C.) and about 1200° F. (about 649° C.) (below $AC_1$). The temperature drop occurred in about 1 minute. The bars were radially forged to a diameter of 1.000 inch (2.54 centimeters) in seven reductions. The calculated reduction ratio was 56%. The 1.000 inch (2.54 centimeters) diameter bars were force-convection, air cooled to room temperature.

Similar to the temperature control described in Examples 1 and 2, the bars were held at as constant temperature as possible. Temperature of each of the bars was monitored during the process and between reductions to ensure that the temperature change was negligible.

Figure 5A:
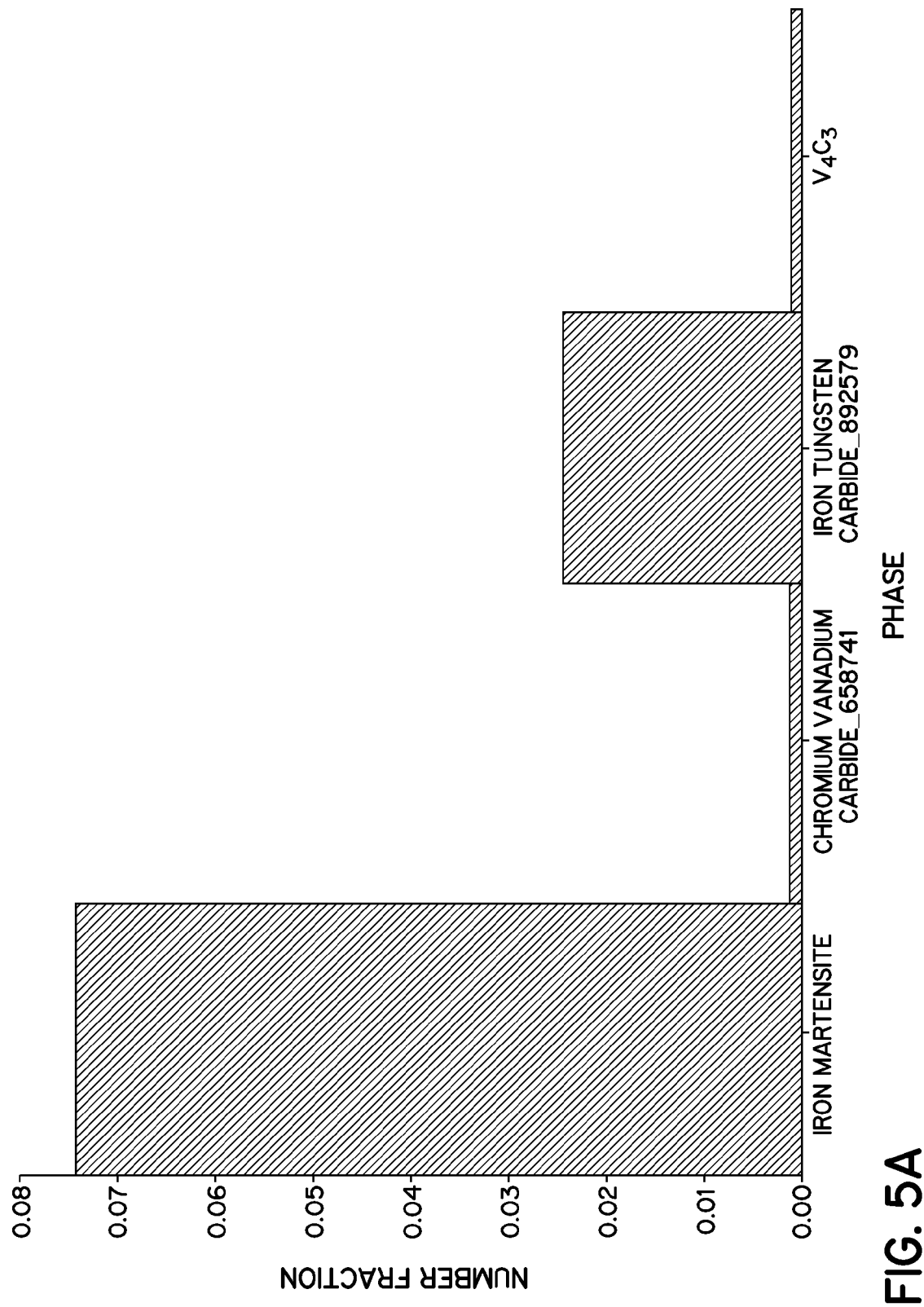
FIGS. 5A, 5B, and 5C are graphical representations of measurements of the phases present, a distribution of misorientation angles of the grains, and a pole figure, respectively, of another exemplary embodiment of the present invention made of M2 tool steel.
Figure 5B:
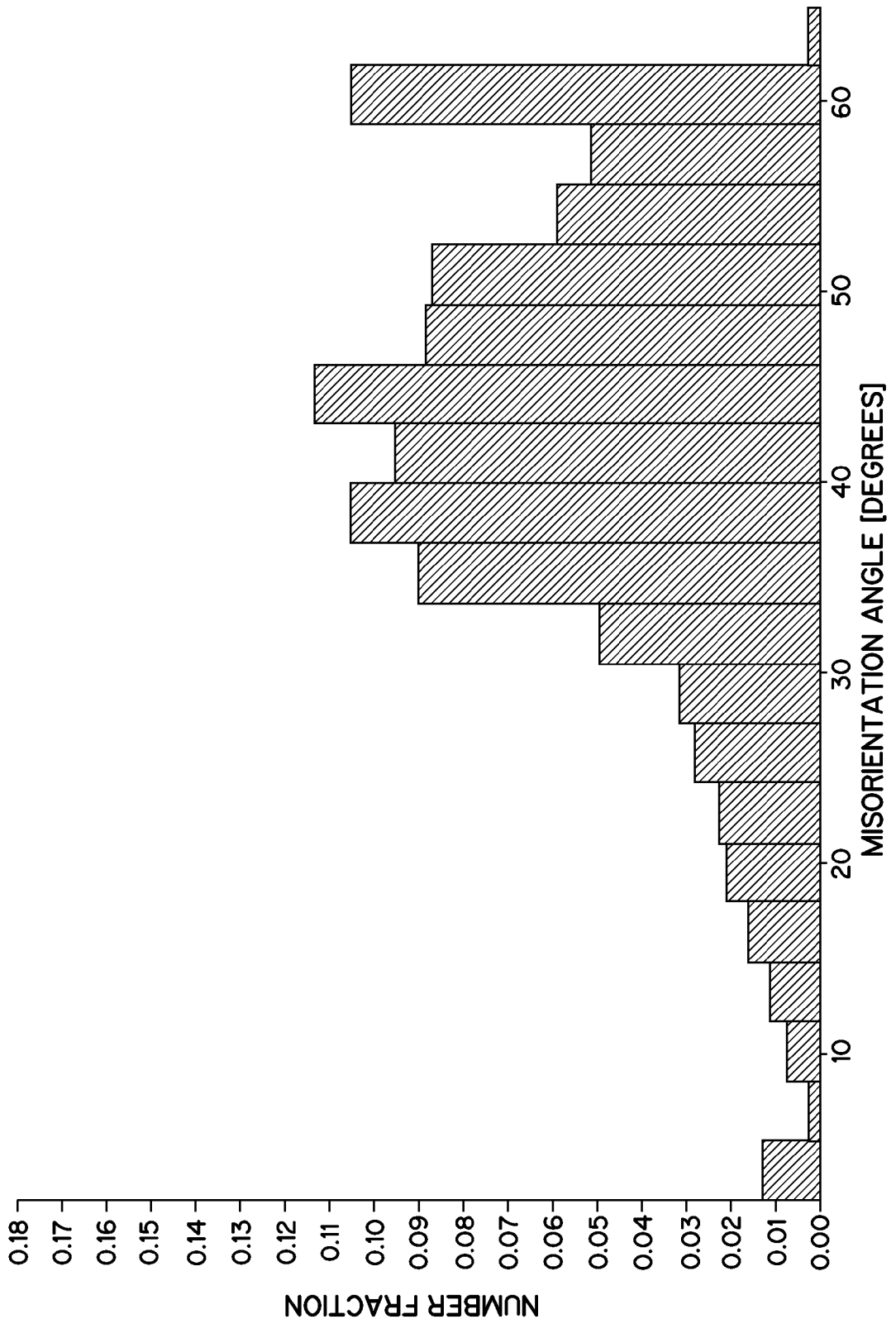
Figure 5C:
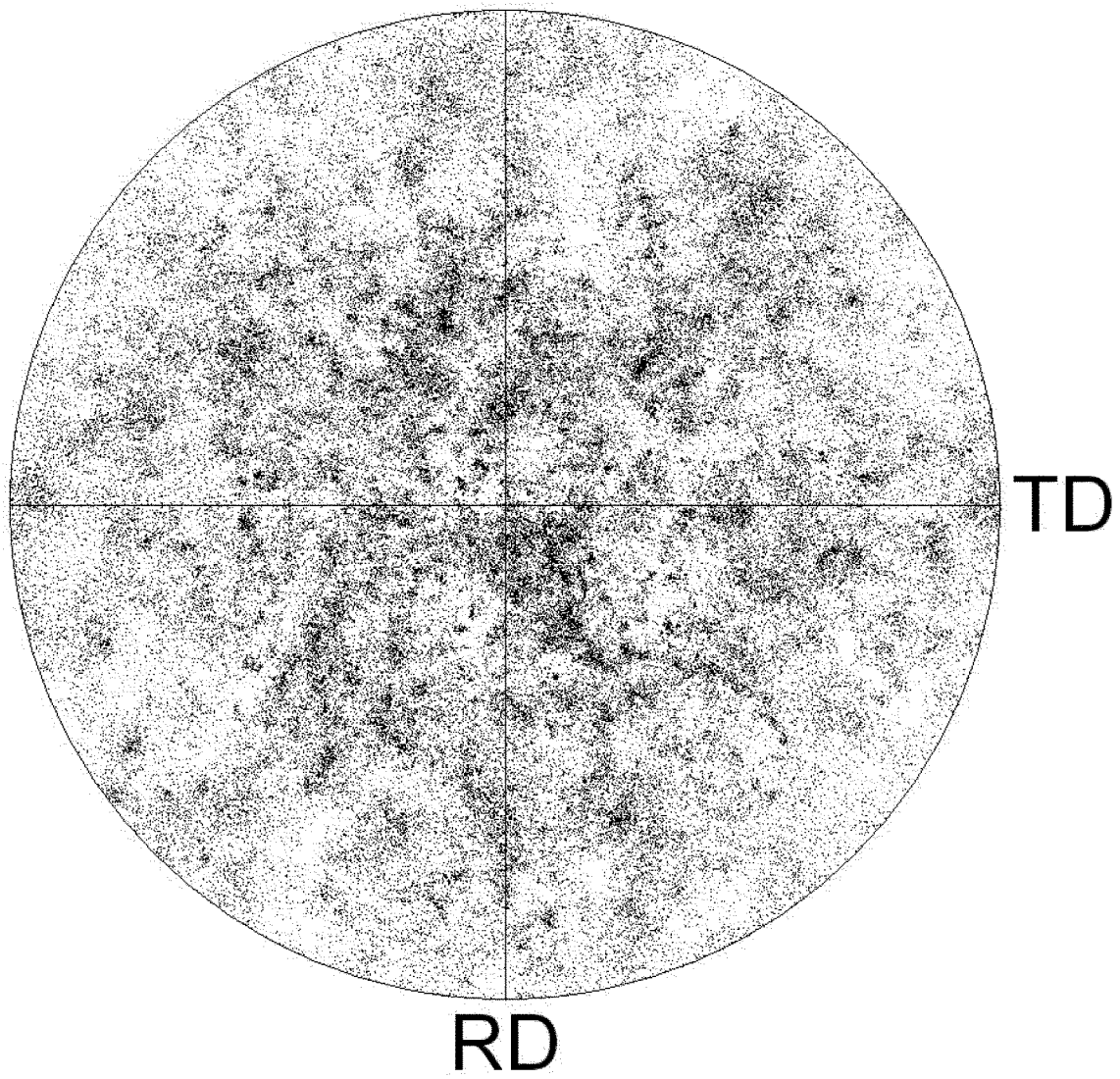

Small sections were cut from each bar during intermediate reductions for analysis. None of the samples exhibited a microstructure characteristic of dynamic recrystallization. The phases were determined, measurements of the misorientation between grains were taken, and a pole figure was developed for the [001] plane of martensite at a location that was one-half of the radius of the cross section of the bar or at about 0.25 inches from the center of the bar. The phase analysis of one M2 bar of Example 3 is shown in FIG. 5A. The number fraction of the phases in FIG. 5A was 0.737644 iron martensite, 0.0111572 chromium-vanadium carbide (658741), 0.240541 iron-tungsten carbide (892579), and 0.0106579 $V_4C_3$. A representative distribution of misorientation angles between the martensitic grains for one of the M2 tool steel bars of Example 3 is shown in FIG. 5B. The pole figure developed for this M2 bar is shown in FIG. 5C.

COMPARATIVE EXAMPLE 1

An as-rolled AISI M2 bar stock was heat treated in a 2 bar vacuum furnace using standard heat treatment cycles by heating the bar to above 2250° F. (about 1232° C.) followed by three standard tempering cycles of heating to about 1000° F. and holding for about 45 minutes to 1 hour and cooling to achieve the same hardness as the Examples 1 and 3, i.e. HRC 61~63. The heat treated bar was then ground to the same outside dimensions as the bars of Example 3.

Figure 6A:
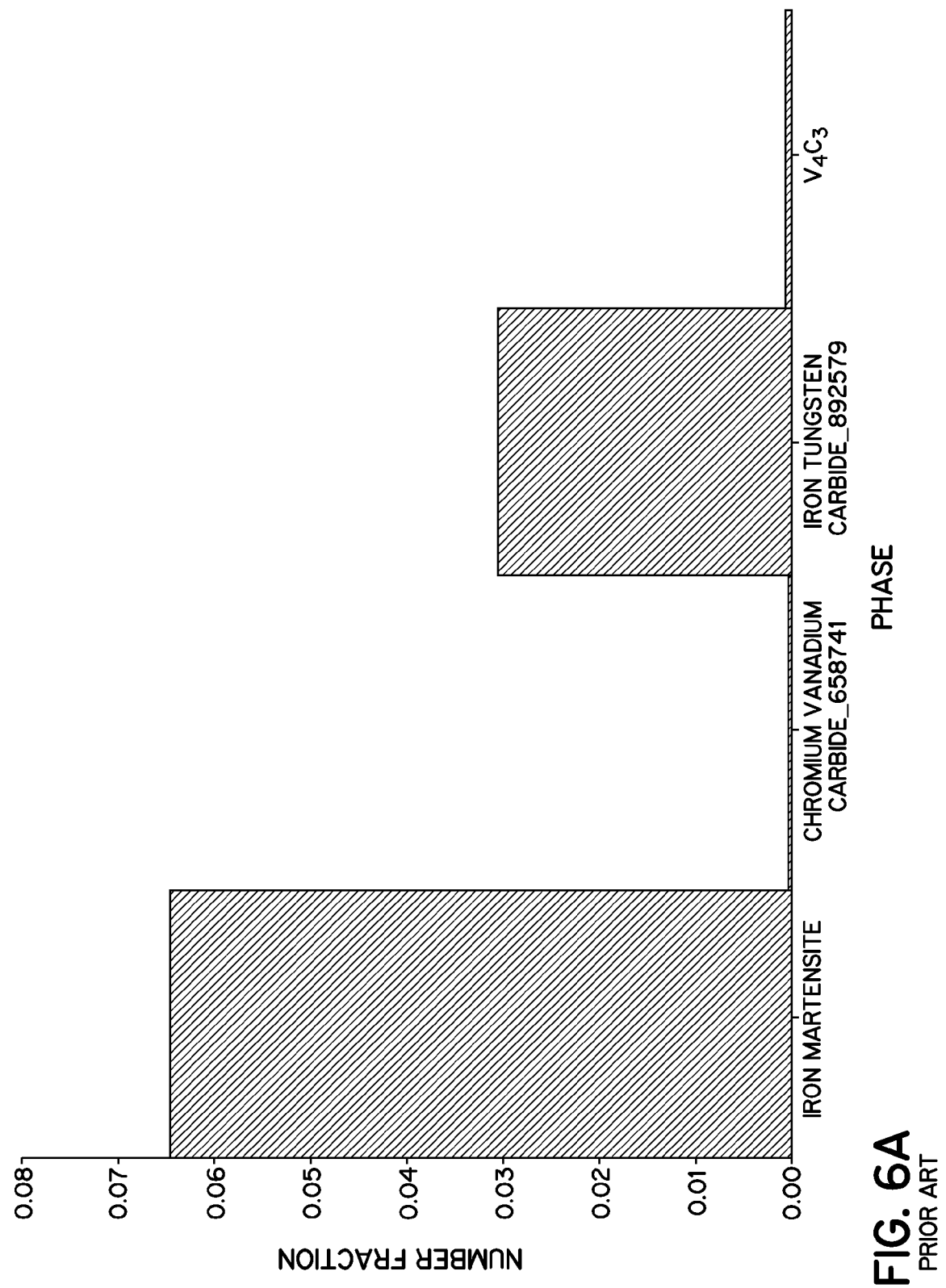
FIGS. 6A, 6B, and 6C are graphical representations of the phases present, a distribution of misorientation angles of the grains, and a pole figure, respectively, of an M2 tool steel bar heat treated according to the prior art.
Figure 6B:
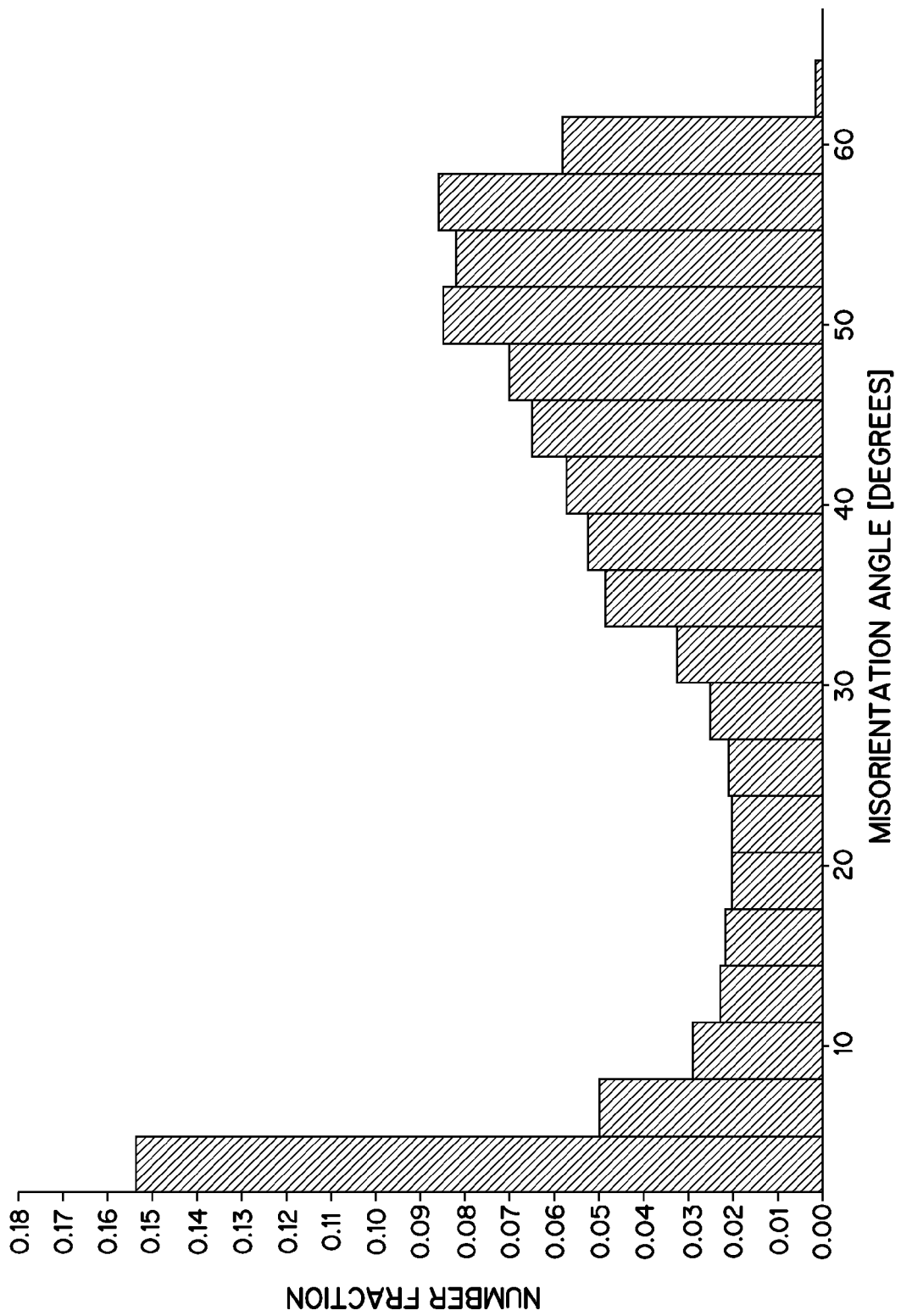
Figure 6C:
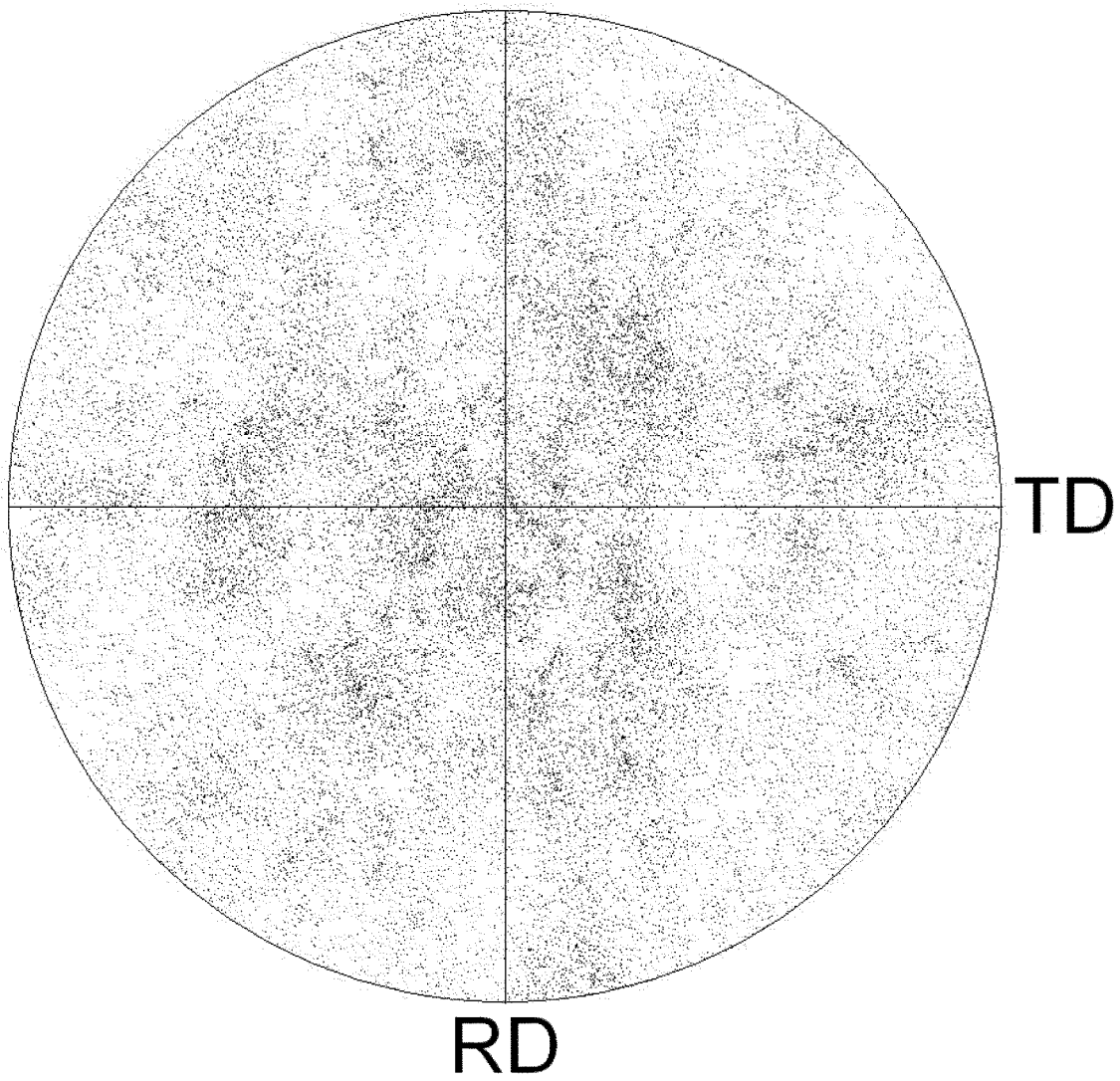

Measurements of the phases, misorientation angle, and pole figure for the comparative bar are shown in FIGS. 6A, 6B, and 6C. The number fraction of the phases indicated in FIG. 6A was 0.660257 iron martensite, 0.00451285 chromium-vanadium carbide (658741), 0.330886 iron-tungsten carbide (892579), and 0.00434446 $V_4C_3$. The phases present in each of the bars was substantially the same as provided by a comparative analysis of FIGS. 4A, 5A, and 6A.

However, the dislocation density of each of the bars of Examples 1 and 3 are substantially higher than the bar of Comparative Example 1. Specifically, by comparing FIGS. 4B and 5B with FIG. 6B, the misorientation angles of each of the M2 bars of Example 1 and 3 is significantly higher than the comparative M2 bar shown in FIG. 6B. The average of the distribution of misorientation angles for the bar of Example 1 (FIG. 4B) was about 36 degrees, the average of the distribution misorientation angles for the bar of Example 3 (FIG. 5B) was about 42 degrees, and the average of the distribution of misorientation angles of the bar of Comparative Example 1 (FIG. 6B) was about 34 degrees. The high average misorientation angles in the Examples 1 and 3 M2 tool steel bars relative to the comparative heat treated M2 bar indicates a higher dislocation density and strain. It is believed that deforming at a temperature less than $AC_1$ may allow for increase in misorientation angle of grains versus deforming at high temperatures as the grains have less thermal energy and recover from deformation at a slower rate.

The improved dislocation density for the M2 bars of Examples 1 and 3 is also substantiated by the pole figures shown in FIGS. 4C and 5C, respectively, when compared to the pole figure of the M2 bar of Comparative Example 1 as shown in FIG. 6C. The pole figures indicate that the density of dislocations or number of dislocations for the bars of Examples 1 and 3 are significantly higher than the dislocation density for the bar of Comparative Example 1 that was heat treated only. The relative dislocation density is indicated by the density of dots in each of the graphs. Therefore, Example 1 (FIG. 4C) has the highest number of dislocations followed by Example 3 (FIG. 5C) with Comparative Example 1 (FIG. 6C) having the least number of dislocations.

EXAMPLE 4

A few of the 1.000 inch (2.54 centimeters) diameter bars from the process of Example 3 were reheated to 2050° F. (121° C.) (above $AC_1$ but below $AC_3$). The bars were removed from the furnace and allowed to air cool to a process temperature of between about 1100° F. (about 593° C.) and about 1200° F. (about 649° C.). Once the process temperature was reached, the bars were each radially forged into a bar having a diameter of 0.700 inches (1.778 centimeters) in seven reductions. The calculated reduction ratio was 51%.

The processed bars were allowed to air cool to room temperature. Several samples were cut from each bar at intermediate reductions. As with the samples of Example 3, none of the bars exhibited a microstructure characteristic of dynamic recrystallization.

As before, temperature was monitored during the process and between reductions to ensure that the temperature change was negligible.

The bars were then tempered three times at between about 950° F. (about 510° C.) and about 1000° F. (about 538° C.) for about 3 hours in a vacuum furnace. It was confirmed that the tempering process converted any retained austenite into martensite. It was noted that in examples 1-4 above, the processed bars contained grains that were elongated and preferentially oriented along the longitudinal axis of the bars.

While Examples 1 through 4 utilize radial forging, other forging techniques that are known in the art may be used to thermo-mechanically process the preform, as set forth above. Accordingly, in the examples that follow, a near-plane-strain forging process was replicated on a horizontal hot-upsetting machine. A preform 65 was developed that would result in cylindrical bars when forged with this machine (see FIGS. 7 and 8A and 8B). The cylindrical bars could then be used as preforms for machining or forming metal-cutting and metal-forming tools.

Figure 7:
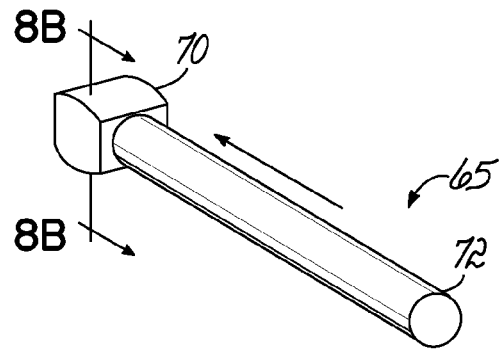
FIG. 7 is a perspective view illustrating an exemplary preform configuration for thermo-mechanical processing a tool steel according to one embodiment of the invention.
Figure 8A:
FIG. 8A is a plan view of the exemplary preform of FIG. 7 before processing, according to one embodiment of the invention.
Figure 8B:
FIG. 8B is a partial cross-sectional view of the exemplary preform of FIG. 8A following deformation and taken along section line 8B-8B of FIG. 7.

With reference to FIGS. 7, 8A, and 8B, in the near-plane-strain forging process, the preform 65 geometry composed completely of tool steel includes an oblong-shaped section 70 and a cylindrical section 72. The cylindrical section 72 does not undergo any deformation and is primarily used for locating and retaining the preform 65 in the machine during forging. The oblong-shaped section 70 or region is heated and undergoes deformation during processing so that a tool may be formed therefrom. Following deformation a deformed preform 75 has a deformed oblong section 73 or region, as shown best in FIG. 8B.

Figure 9:
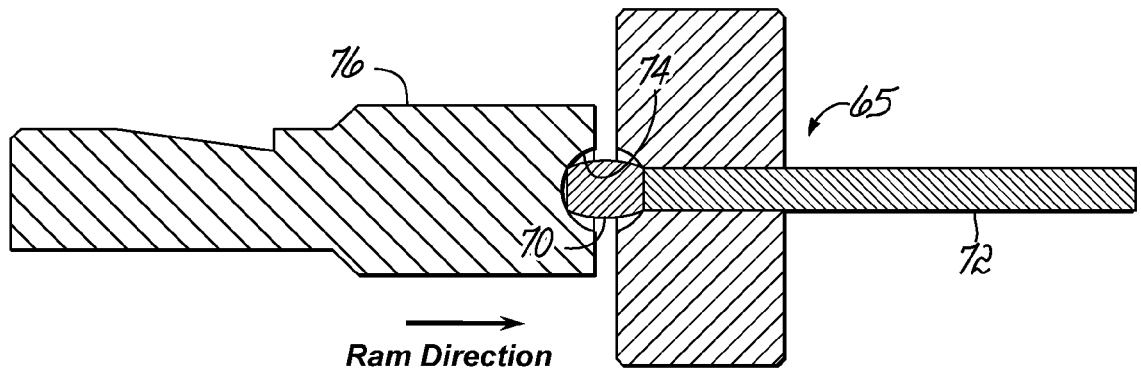
FIG. 9 is a schematic cross-sectional representation of an exemplary die and ram for thermo-mechanically processing the preform configurations depicted in FIGS. 4 and 5A.

With reference now to FIG. 9, in the near-plane-strain forging process, the tool cavity 74 and ram 76 were each designed to form a semi-circular cavity. Collectively, the resulting circular-like shape formed by the closure of the tool cavity 74 and the ram 76 was designed to arrest the movement of the tool steel in the oblong-shaped section 70 in one direction while allowing the tool steel to flow in both the radial and circumferential directions.

EXAMPLE 5

AISI M2 tool steel preforms of the geometry illustrated in FIGS. 7 and 8A were machined from as-rolled mill bar stock. The rolling direction or the primary carbide direction in conventional mill bar stock was always concentric to the axis of the cylindrical section, as indicated by the arrow in FIG. 4. The direction of carbide banding prior to the processing may determine the orientation of carbides following thermo-mechanical processing. Subsequently, the preforms were initially annealed at 1400° F. (760° C.) for between 45 minutes and 60 minutes in a vacuum furnace to relieve any residual stresses and to attain a near-equiaxed grain structure.

Following annealing, the oblong-shaped section of each preform was heated to above $AC_1$ to a temperature of about 1850° F. (about 100° C.) using an induction coil. At this process temperature, the microstructure was believed to be composed of austenite. The temperature was monitored using an infrared pyrometer built into the 50-Ton horizontal upsetting machine used to simulate the near plane-strain forging operation. Once the oblong-shaped section of the preform reached 1850° F. (100° C.), each preform was individually forged into a near-semi-circular cross section (see FIG. 8B for example).

Following forging, each bar was quenched to room temperature by convection air cooling. The microstructure after forging was composed of fine-grained austenite. Following quenching, the austenite transformed into martensite and carbides precipitated. This microstructure was considered unstable and was stress relieved in a vacuum furnace at a temperature between about 950° F. (about 510° C.) and about 1000° F. (about 538° C.) and at a pressure of about 2 Bars. After stress relieving, the preforms were processed through three tempering cycles to convert retained austenite to martensite at between about 1200° F. (about 649° C.) and 1400° F. (760° C.) for 45 to 60 minutes per cycle followed by a furnace cool to convert retained austenite in the microstructure to martensite.

Impact strength gain from near-plane-strain forging was attributed to the increase in dislocation density and decrease in austenitic grain size. However, unlike the radial forging process, in near-plane-strain forging, the heat loss to the environment is negligible, as the deformation occurs almost instantaneously along the entire length of the oblong-shaped section.

EXAMPLE 6

AISI M2 tool steel preforms of the geometry illustrated in FIG. 8A were machined from as-rolled mill bar stock and were then processed. As with the preceding preforms, the carbide rolling direction prior to processing was oriented in the conventional direction (see FIG. 7). Prior to heating and deforming, the preforms were annealed in a vacuum furnace at 1400° F. (760° C.) for between 45 minutes and 60 minutes to relieve any residual stresses in the preform and to obtain a near-equiaxed, grain structure.

Each of the preforms was heated to a temperature of 2050° F. (1121° C.) using an induction coil. This temperature was above $AC_1$ but below $AC_3$. Temperature was monitored using an infrared pyrometer. Both the coil and pyrometer were built into the ACMA 50-Ton horizontal upsetting machine. The microstructure at temperatures between $AC_1$ and $AC_3$ was composed of austenite. Following heating to 2050° F. (1121° C.), the oblong-shaped sections were allowed to air cool to a temperature between about 1100° F. (about 593° C.) and about 1200° F. (about 649° C.). The temperature drop occurred in about 1 minute. The microstructure was composed of metastable austenite. The oblong-shaped sections were then forged into a circular cross-section configuration while being held at a process temperature between 1100° F. (593° C.) and 1200° F. (649° C.).

The forged preforms were then allowed to cool to room temperature. Upon cooling, martensitic transformation and carbide precipitation occurred resulting in a homogeneous, fine-grained microstructure in the oblong-shaped section of the preform. The microstructure was, however, considered unstable for most applications due to presence of retained austenite. The preforms were subsequently tempered three times at a temperature of between 950° F. (510° C.) and 1000° F. (538° C.) for between 45 minutes and 60 minutes.

A gain in impact strength was observed in each of the deformed oblong-shaped sections. The impact strength gain was attributed to increase in dislocation density, reduction in austenitic grain size, and initiation of carbide precipitation. Also, similar to the results observed during radial forging trials, the mechanical properties of the preforms forged at a temperature less than $AC_1$, were improved over those forged above $AC_1$. It is believed that dislocation densities in the preforms forged at lower temperatures are considerably higher than the dislocation densities generated by forging at higher temperatures.

Figure 10A:
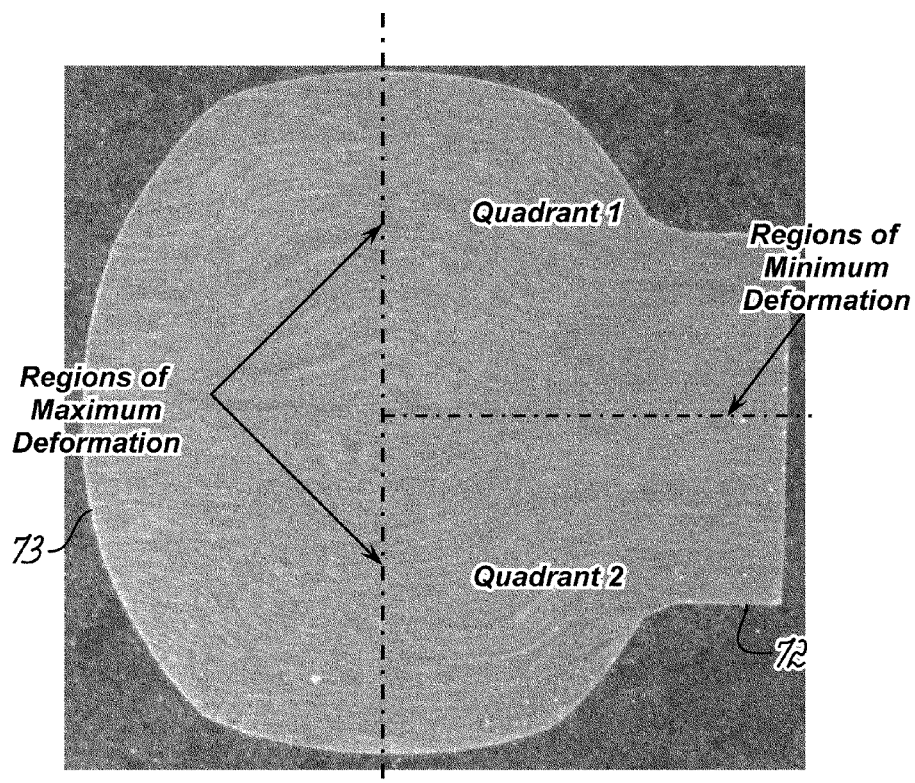
FIG. 10A is a photomicrograph taken at a magnification of 13× of a cross section taken through an oblong-shaped section of FIG. 8B of a preform configured as shown in FIG. 8B.
Figure 10B:
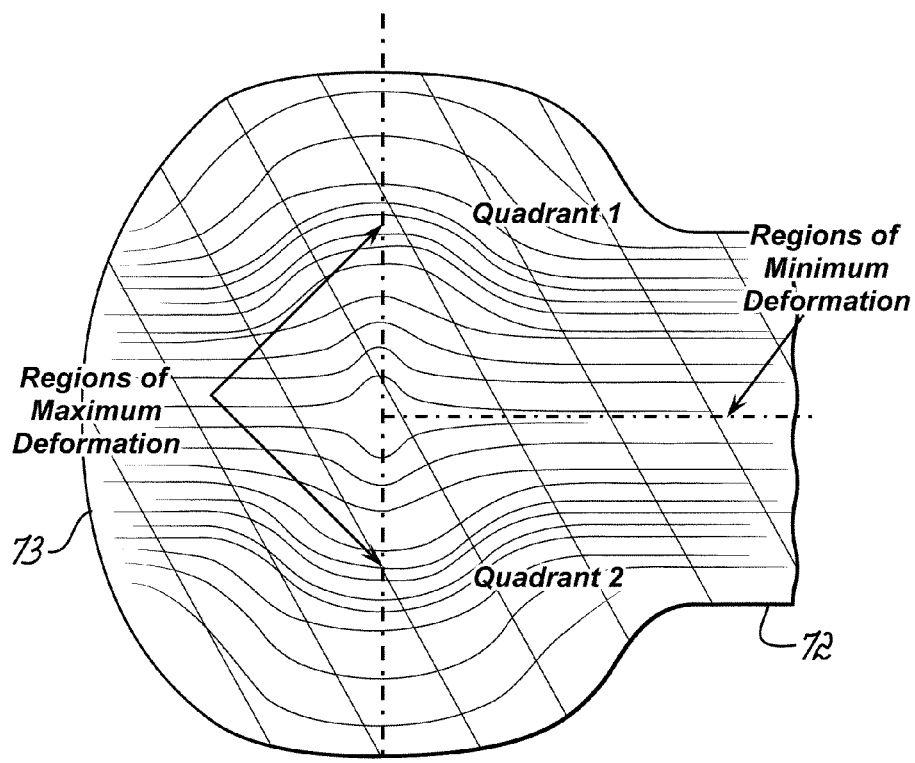
FIG. 10B is a schematic representation of the photomicrograph of FIG. 10A, depicting the preferential grain orientation drawn as curved lines.

With reference to FIGS. 10A and 10B, while the thermo-mechanical process in the previous exemplary embodiments improves impact strength, there are regions of relatively high and relatively low strengths in each oblong-shaped section due to the inherent nature of the near plane-strain forging process. The regions of maximum and minimum deformation are oriented substantially perpendicular to one another. For the purpose of clarity, the preferential orientation of the grains following forging are indicated by curved lines in FIG. 10B. The regions of relatively low impact strength are typically those that come in contact with, or are in the vicinity of, the tool cavity and ram. The regions of relatively high impact strength are related to the region of maximum deformation. The dimensions of the cross section show in FIG. 10A are about 13.11 mm in height and about 11.03 mm in width, where the width is measured from the end (left) of the preform to a location where the surface of the deformed oblong-shaped section 73 transitions to the cylindrical section 72 (right).

In preforms where maximum improvement and near-uniform material strength are required, a multi-step plane-strain forging process may be used to sequentially improve the strength of the relatively low impact strength regions. For example, to obtain thermo-mechanically treated cylindrical bars for metal-forming and metal-cutting tools, a preform in a configuration of a bar with a cross-sectional geometry of a rectangle or a square could be thermo-mechanically treated using near-plane-strain forging into a bar with oval cross-section. Subsequent thermo-mechanical processing of the oval cross-section to form a bar with a circular cross-section may provide a more uniform distribution of deformation.

Specifically, with reference to FIG. 10B, as a result of a first thermo-mechanical treatment using plane-strain forging, the relatively low strength regions would be aligned along or close to the regions of minimum deformation, and the relatively high strength regions would be aligned relative to the regions of relatively high deformation. Thus, a rectangular or square bar that is forged into an oval cross section may be used as a preform for a subsequent near-plane-strain forging process. In the subsequent process, the relatively low strength regions may be aligned along the direction of highest deformation. This orientation may be, for example, perpendicular to the initial deformation direction. The relatively low strength regions would, therefore, be strengthened as a result of deformation in that region. Conversely, the relatively high strength regions from the first forging operation would observe minimal deformation strength and therefore minimal improvement.

EXAMPLE 7

Figure 11A:
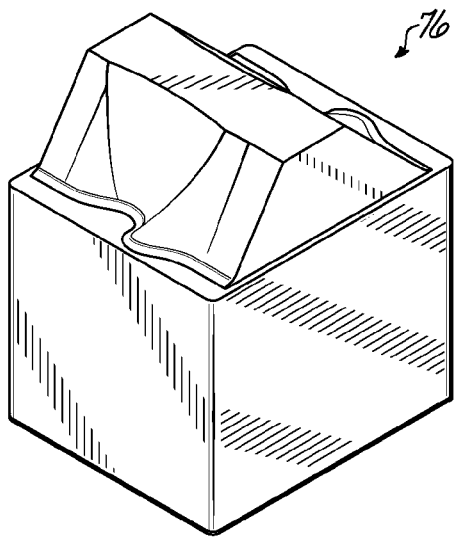
FIGS. 11A and 11B are perspective views depicting one configuration of a preform prior to deforming and following deforming and machining respectively.

Two tools were prepared from a powdered metal preform of a T15 tool steel. The preform was machined from an annealed Hot Isostatically Pressed T15 powdered metal. It was noted that the microstructure of the plate was nearly isotropic as a result of the method of its preparation. The preform had the configuration shown in FIG. 11A. As shown, one end of the preform 76 had a pyramidal shape. The overall length of the preform measured 5.75 inches (14.6 centimeters) with the pyramidal section being 1.75 inches (4.445 centimeters) of the total length.

Figure 11B:
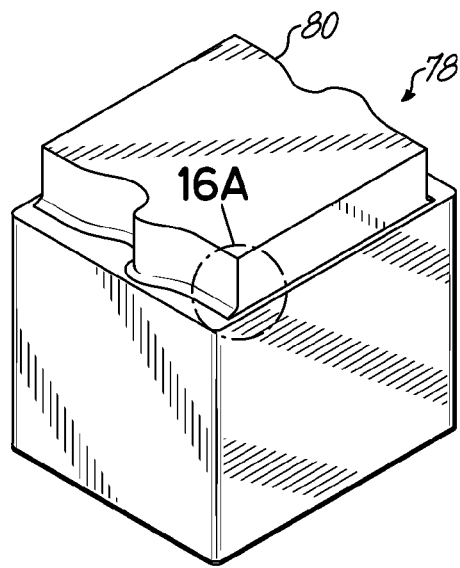

The preform 76 was heated with an induction heater to a process temperature between 2000° F. (1093° C.) and 2050° F. (1121° C.) (between $AC_1$ and $AC_3$) in approximately 4 minutes. The hot preform was forged in one cycle to near net shape with a 1,000 Ton horizontal mechanical AJAX upsetter with 500 tons of die clamping force. The forged preform 78 is shown in FIG. 11B. In particular, the 1.75 inch (4.445 centimeters) pyramidal end was forged into a 1 inch (2.54 centimeters) rectangular end 80, as shown.

Following forging, the forged 78 was stress relieved in an oven at 1400° F. (760° C.) for between 45 and 60 minutes. The forged preform 78 was allowed to cool in the oven to room temperature.

The stress-relieved preform was triple tempered to convert retained austenite to martensite. The final hardness was measured at between 63 HRC and 66 HRC. The triple tempered parts were machined to remove scales, decarb, and to provide the final tool shape. A set of two tools 18*b*, 18*c* was made from the preform configuration shown in FIG. 11B by cutting the preform shown in half.

Figure 11C:
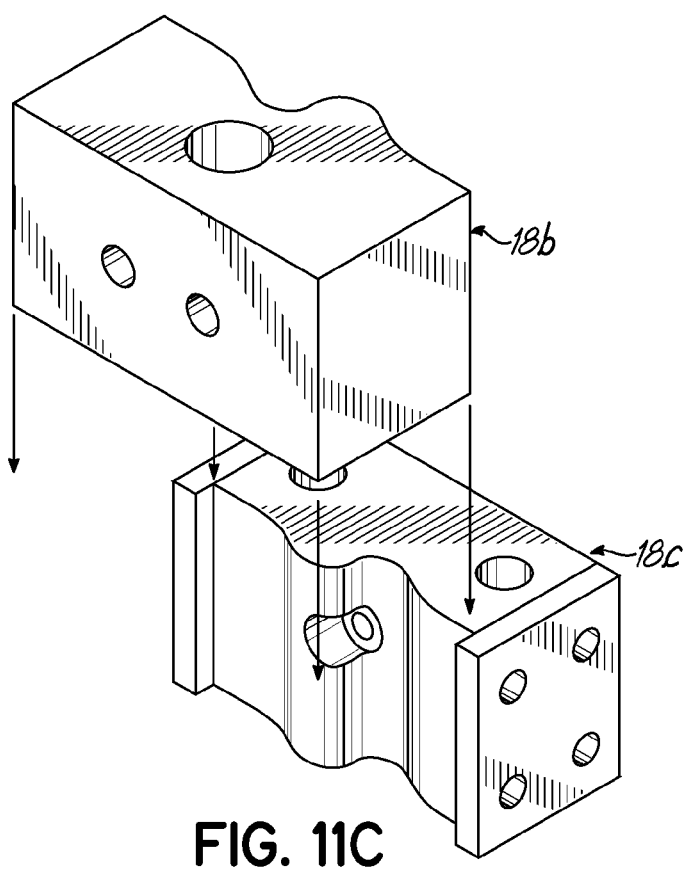
FIG. 11C is a perspective view of a set of tools made from the preform shown in FIG. 11B in operable position with respect to one another to provide a shearing or trimming motion for cutting sheets of steel material.

The two tools 18*b*, 18*c* operated relative to one another (as indicated by the arrows in FIG. 11C), i.e. an upper tool and a lower tool, to cut a sheet steel workpiece (not shown). The clearance between tools was 0.006 inches (0.01524 centimeter). The workpiece was 22MnB$_5$ steel with an AlSi coating that was sold under the trademark USIBOR® 1500P. The workpiece steel was press-hardened to UTS 1500 MPa (50HRC). The sheet measured 1.85 mm (0.07283 inch) thick. Testing was done at approximately 68° F. (approximately 20° C.). The wear at the cutting edge was monitored at four locations. Measurements were made of the cutting edge profile every 5,000 impacts or cycles.

The edge profile measurements for each of the upper and lower T15 tools are shown in FIGS. 12A, 13A, 14A, and 15A, which also provide the edge profiles for a tool of a reference material and CPM® M$_4$ powdered metal. (The tools made of CPM® M$_4$ powdered metal are fully described in Example 8, below.) While wear measurements at four locations on both the upper and lower tools were made, only the two highest wear locations on the upper and the lower tools are provided in the figures. The profile measurements were made at the locations indicated in FIGS. 12B, 13B, 14B, and 15B, respectively.

Figure 12B:
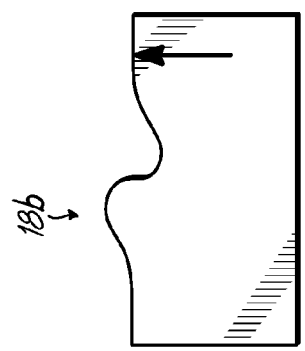
Figure 12A:
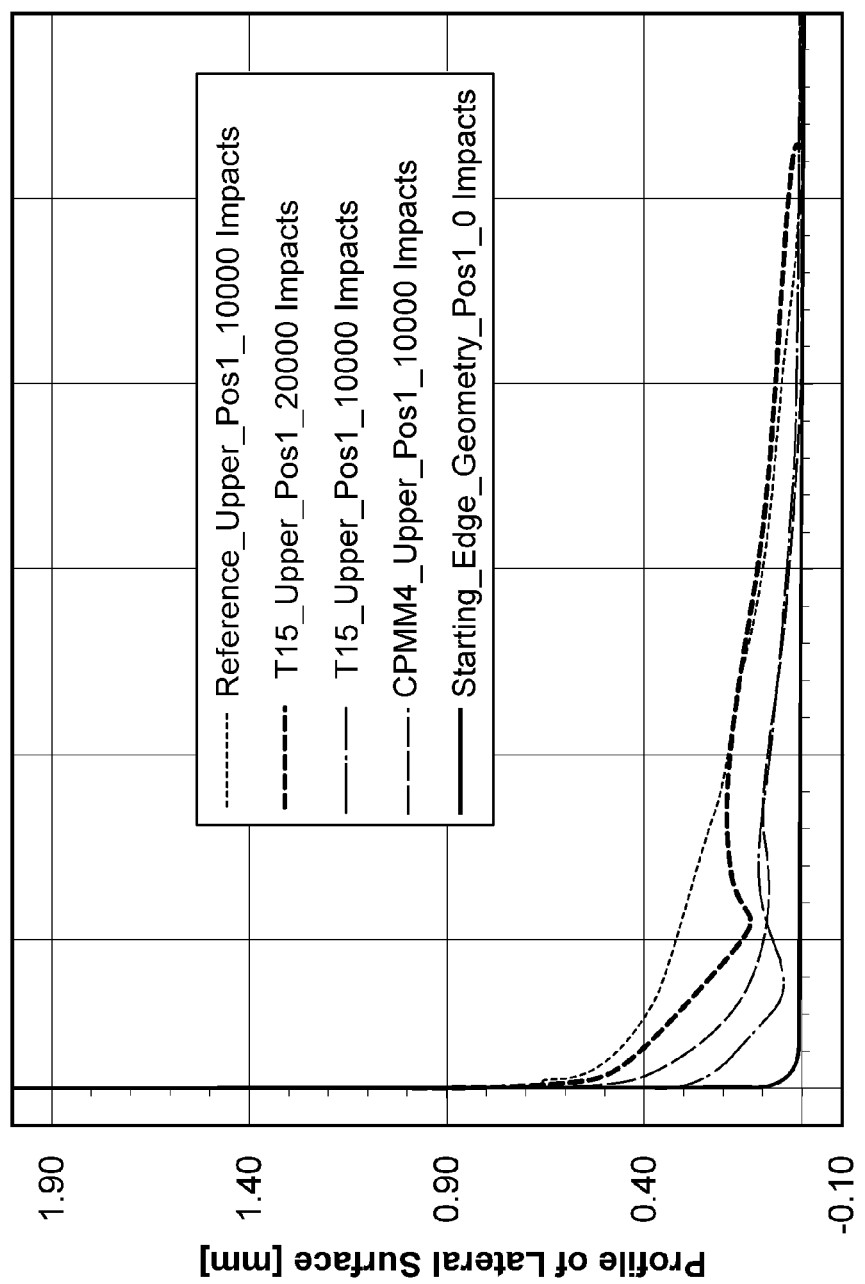
Figure 14A:
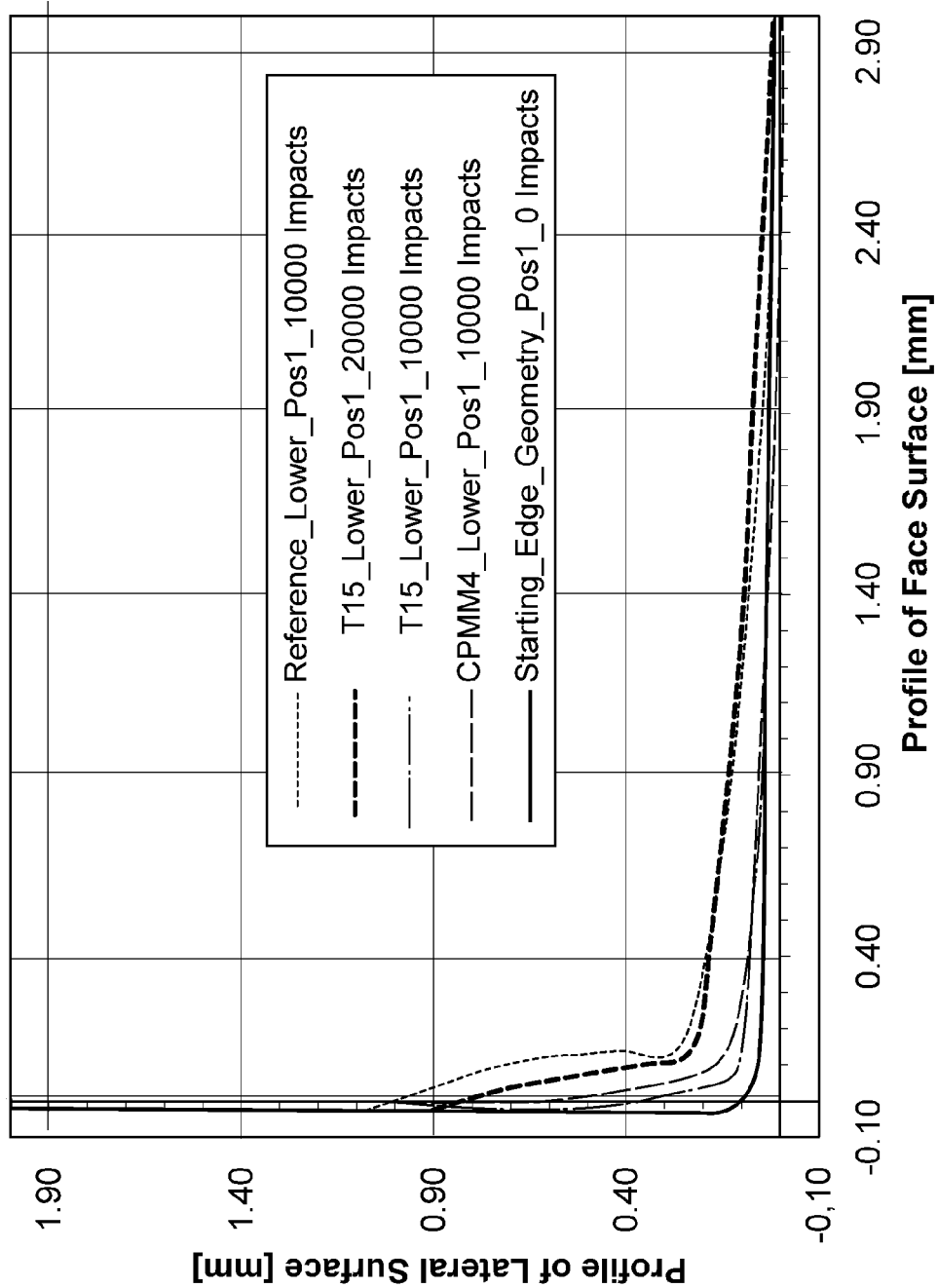
Figure 14B:
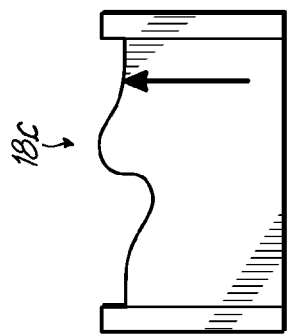
Figure 15A:
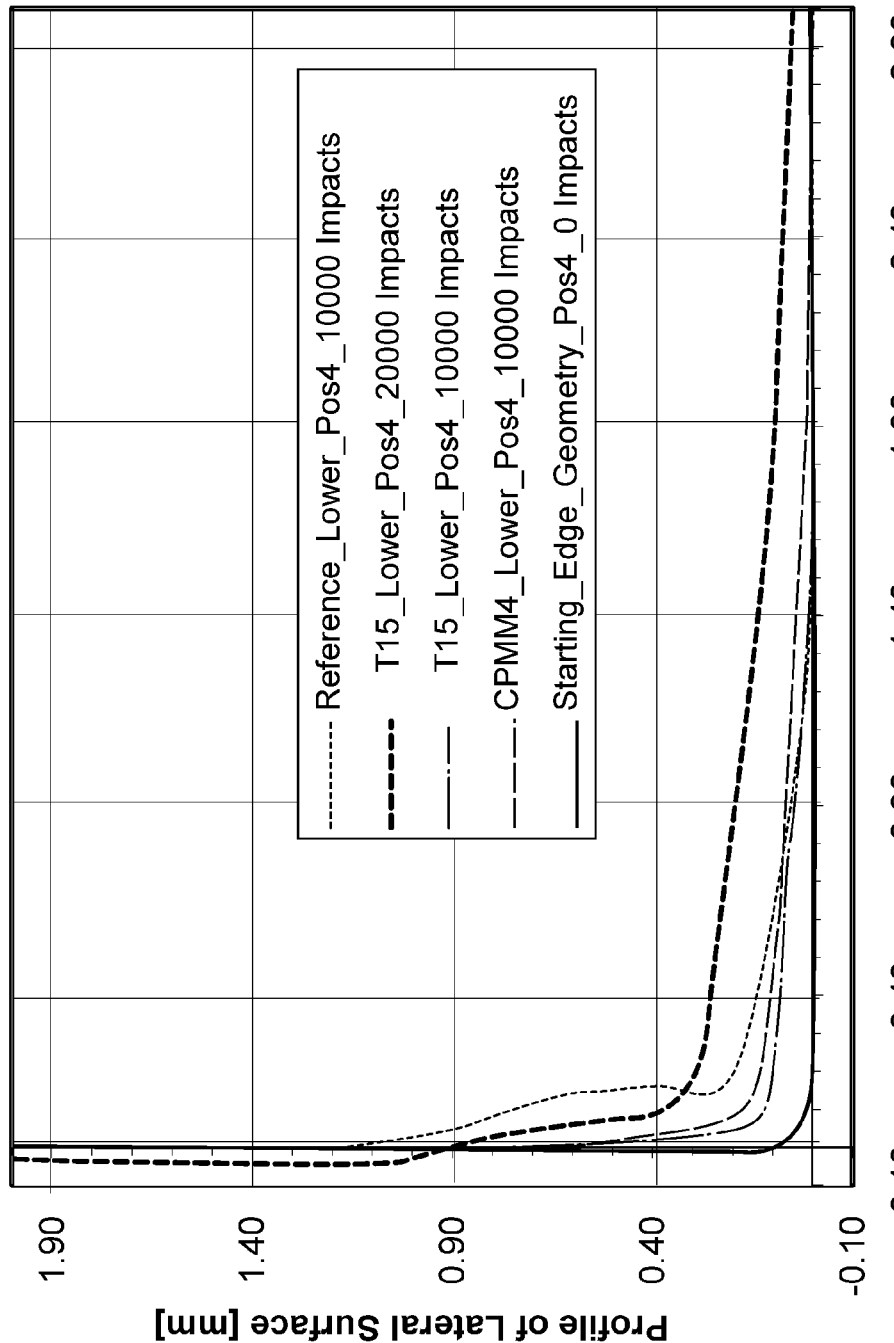
Figure 15B:
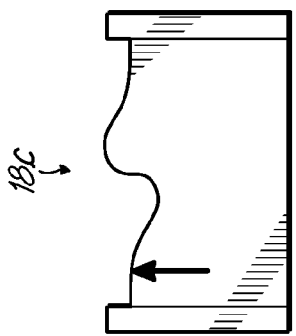

More specifically, FIGS. 12A and 13A are graphs of the edge profile of a cutting edge of the upper tools at locations specified in FIG. 12B (position 1) and FIG. 13B (position 4), respectively. And, FIGS. 14A and 15A are graphs of the edge profile of the lower tools at locations specified in FIG. 14B (position 1) and FIG. 15B (position 4), respectively. The edge profiles at locations 1 and 4 as indicated in the figures are illustrative of the wear measurements at the remaining two, unreported locations.

With reference to FIGS. 12A, 13A, 14A, and 15A, the line that is labeled "Starting Edge Geometry" represents the edge geometry prior any use. The line that is labeled "Reference," represents measurements made on a tool made of a reference material processed according to an industry standard.

The edge profiles at locations 1 and 4 for the T15 tool at 10,000 and 20,000 hits are labeled "T15 . . . 10000 Impacts" and "T15 . . . 20000 Impacts," respectively. As illustrated by the graphs, the edge of the T15 tool made according to the above procedure had less wear at 10,000 impacts than the reference material had at 10,000 impacts on both the upper and lower tools at each location. At 20,000 impacts, the T15 tool had a comparable amount of wear as the reference material tool at 10,000 impacts. Thus, a T15 tool according to one embodiment of the invention provides nearly double the resistance to wear and impact than the reference material.

EXAMPLE 8

Two tools were prepared from a powdered metal preform of a CPM® M4 tool steel. (CPM® is a trademark of the Crucible Materials Corp., New York.) The preform was machined from an annealed CPM® M4 powdered metal bulk material. It was noted that the microstructure of the CPM® M4 plate had primary carbide banding as a result of the rolling direction used to prepare the bulk CPM® M4 material. The preform had the configuration shown in FIG. 11A. As shown, one end of the preform had a pyramidal shape. The overall length of the preform measured 5.75 inches (14.6 centimeters) with the pyramidal section being 1.75 inches (4.445 centimeters) of the 5.75 inches (14.6 centimeters).

The preform was heated with an induction heater to between 2000° F. (1093° C.) and 2050° F. (1121° C.) (between AC$_1$ and AC$_3$) in approximately 4 minutes. The hot preform was forged in one cycle to a near net shape with a 1,000 Ton horizontal mechanical AJAX upsetter with 500 tons of die clamping force. The forged preform is shown in FIG. 11B. In particular, the 1.75 inch (4.445 centimeters) pyramidal end (shown in FIG. 11A) was forged into a 1 inch (2.54 centimeters) rectangular end, as shown.

Following forging the preform was stress relieved in an oven at 1400° F. for between 45 and 60 minutes. The preform was allowed to cool in the oven to room temperature.

The stress-relieved preform was triple tempered to convert any retained austenite to martensite. The final hardness was measured at between 62 HRC and 64 HRC.

Figure 16A:
FIG. 16A is a photomicrograph taken of a cross section at a magnification of 17× of a region shown in FIG. 11B encompassing a cutting edge of one tool illustrating the preferential grain orientation in an area encompassing the cutting edge.
Figure 16B:
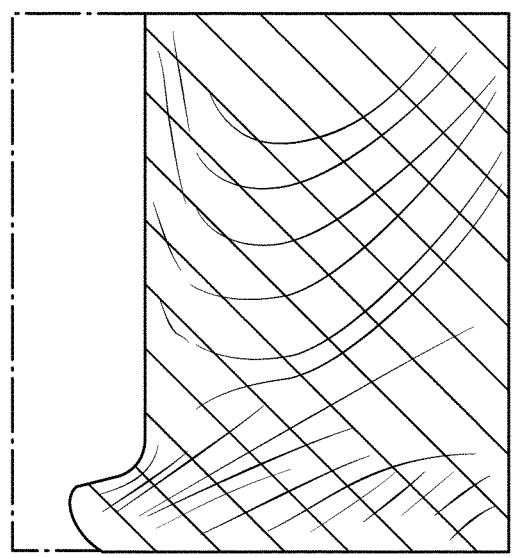
FIG. 16B is a schematic representation of the photomicrograph of FIG. 16A with lines drawn to illustrate the preferential grain orientation.

The preferential grain orientation in a region of the cutting edge of the forged preform of FIG. 11B was similar to that shown in FIG. 16A. The dimensions of the sample shown in FIG. 16A was 17.98 mm from top to bottom and 13.82 mm from side to side. From the edge profile measurements shown in FIGS. 12A, 13A, 14A, and 15A, the CPM®M$_4$ forged tools had less wear than the reference material at 10,000 impacts. Again, substantial improvement in the life of the tools was observed.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader embodiments is therefore not limited to the specific details, representative apparatus and method, and illustrative example shown and described. Accordingly, departures may be made from such details without departing from the scope of the applicants' general inventive concept

What is claimed is:

1. A method of thermo-mechanically processing a preform composed of tool steel having a martensitic start temperature and a stable austenitic temperature, the preform having a first region and a second region proximate the first region, each of the first and second regions containing austenite, and the first region including an outer surface, a plurality of outer dimensions for the outer surface, and a microstructure, the method comprising:
    establishing at least the first region of the preform at a process temperature between the martensitic start temperature and the stable austenitic temperature;
    while the first region of the preform is at the process temperature, deforming the first region without deforming the second region to change at least one of the outer dimensions of the first region and to modify the microstructure of the first region over a depth extending from the outer surface to a depth of 1 millimeter or more beneath the outer surface; and
    after the first region is deformed, cooling the first region to room temperature,
    wherein the microstructure in the first region includes martensitic grains having a distribution of misorientation angles characterized by an average misorientation angle that is greater than an average misorientation angle from heat treating without deforming and differs in at least one microstructural characteristic from the second region.

2. The method of claim 1 wherein, after the first region is deformed and as a result of deforming, the outer dimensions of the first region are near net shape of a tool used in metal-forming or metal-cutting applications.

3. The method of claim 1 wherein the first region has a cross-sectional area, and the depth extends across the cross-sectional area.

4. The method of claim 1 wherein the first region has a cross-sectional area, and the change in the at least one of the outer dimensions reduces the cross-sectional area.

5. The method of claim 1 wherein the first region has a length, and the change in the at least one of the outer dimensions increases or decreases the length of the first region.

6. The method of claim 1 wherein the average misorientation angle is greater than about 34°.

7. The method of claim 1 wherein the process temperature is held isothermal while the first region is deformed.

8. The method of claim 1 wherein the process temperature is greater than an austenitic start temperature of the tool steel.

9. The method of claim 8 wherein establishing the preform at the process temperature includes heating the first region to a temperature that does not exceed the stable austenitic temperature.

10. The method of claim 1 further comprising:
prior to deforming the first region, heating the first region to a temperature above an austenitic start temperature of the tool steel and cooling the first region from the temperature above the austenitic start temperature to the process temperature.

11. The method of claim 1 wherein the process temperature is above an austenitic start temperature of the tool steel, and further comprising:
while the first region is deformed, holding the process temperature above the austenitic start temperature.

12. The method of claim 1 wherein the process temperature is between the martensitic start temperature and an austenitic start temperature of the tool steel, and further comprising:
while the first region is deformed, holding the process temperature between the martensitic start temperature and the austenitic start temperature.

13. The method of claim 1 wherein the microstructure of the first region does not recrystallize.

14. The method of claim 1 further comprising:
tempering the first region, wherein tempering includes heating the first region to a temperature that does not exceed the process temperature.

15. The method of claim 1 further comprising:
prior to deforming the first region, assembling the tool steel preform in the configuration of a shell with a core made of dissimilar steel, wherein establishing the first region at the process temperature includes establishing at least the shell at the process temperature, and, while the shell is at the process temperature, deforming at least a portion of the shell.

16. A method of thermo-mechanically processing a preform composed of tool steel having a martensitic start temperature and a stable austenitic temperature, the preform including a first region and a second region proximate the first region, each of the first and second regions containing austenite, and the first region including an outer surface, a plurality of outer dimensions for the outer surface, and a microstructure, the method comprising:
machining the preform from bulk tool steel or bar stock tool steel;
establishing at least the first region of the preform at a process temperature between the martensitic start temperature and the stable austenitic temperature;
while the first region of the preform is at the process temperature, deforming the first region to change at least one of the outer dimensions of the first region and to modify the microstructure of the first region over a depth extending from the outer surface to a depth of 1 millimeter or more beneath the outer surface; and
after the first region is deformed, cooling the first region to room temperature, the microstructure of the deformed first region having a preferred orientation of grains that provides a directionality to the microstructure of the deformed first region,
wherein deforming includes deforming the first region without deforming the second region, and after the first region is deformed and cooled to room temperature, the first region differs in at least one microstructural characteristic from the second region.

17. The method of claim 16 wherein the directionality is relative to one of the surfaces of the tool, relative to a tool axis, or relative to a second deformed region having a second directionality.

18. The method of claim 16 wherein the preferred orientation of grains in the deformed region follows the surface contour of a working surface of a tool.

19. The method of claim 18 wherein the preferred orientation follows the surface contour of the tool formed by two intersecting surfaces, the two intersecting surfaces defining an edge, the microstructure of the deformed region being substantially parallel to each of the two intersecting surfaces and transitioning from a first direction, which is parallel to one surface, to a second direction, which is parallel to the second surface, in an area proximate the edge.

20. The method of claim 16 wherein the bulk tool steel or the bar stock tool steel comprises a powdered metal.

21. The method of claim 1 wherein, prior to deforming the preform, the method further comprises:
machining the preform from bulk tool steel or bar stock tool steel.

22. The method of claim 21 wherein the bulk tool steel or the bar stock tool steel comprises a powdered metal.

* * * * *